United States Patent
Tsukahara et al.

(10) Patent No.: US 9,395,938 B2
(45) Date of Patent: Jul. 19, 2016

(54) STORAGE CONTROL DEVICE AND METHOD FOR CONTROLLING STORAGE DEVICES

(71) Applicant: FUJITSU LIMITED, Kawasaki-shi, Kanagawa (JP)

(72) Inventors: Ryota Tsukahara, Kawasaki (JP); Norihide Kubota, Kawasaki (JP); Atsushi Igashira, Yokohama (JP); Kenji Kobayashi, Kawasaki (JP); Hidejirou Daikokuya, Kawasaki (JP); Kazuhiko Ikeuchi, Kawasaki (JP); Chikashi Maeda, Kawasaki (JP); Takeshi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 216 days.

(21) Appl. No.: 14/328,999

(22) Filed: Jul. 11, 2014

(65) Prior Publication Data
US 2015/0074452 A1 Mar. 12, 2015

(30) Foreign Application Priority Data
Sep. 9, 2013 (JP) .................................. 2013-185965

(51) Int. Cl.
| | | |
|---|---|---|
| *G06F 11/00* | (2006.01) | |
| *G06F 3/06* | (2006.01) | |
| *G06F 11/07* | (2006.01) | |
| *G06F 11/10* | (2006.01) | |

(52) U.S. Cl.
CPC .............. *G06F 3/0689* (2013.01); *G06F 3/065* (2013.01); *G06F 3/0619* (2013.01); *G06F 11/076* (2013.01); *G06F 11/0727* (2013.01); *G06F 11/1092* (2013.01)

(58) Field of Classification Search
CPC ....... G06F 3/0619; G06F 3/065; G06F 3/0689; G06F 11/008; G06F 11/0727; G06F 11/076; G06F 11/1088; G06F 11/1092
See application file for complete search history.

(56) References Cited

U.S. PATENT DOCUMENTS

| | | | | |
|---|---|---|---|---|
| 5,611,069 | A * | 3/1997 | Matoba .................. | G06F 11/008 711/114 |
| 6,442,711 | B1 | 8/2002 | Sasamoto et al. | |
| 6,996,742 | B2 * | 2/2006 | Lerman ................ | G06F 11/1076 348/E5.008 |
| 7,574,623 | B1 * | 8/2009 | Goel ..................... | G06F 11/1088 714/47.2 |
| 8,185,784 | B2 * | 5/2012 | McCombs ............. | G06F 11/004 714/47.2 |
| 2002/0066050 | A1 * | 5/2002 | Lerman ................ | G06F 11/1076 714/6.22 |
| 2004/0260967 | A1 * | 12/2004 | Guha .................... | G06F 11/008 714/3 |
| 2005/0060618 | A1 * | 3/2005 | Guha .................... | G06F 11/008 714/54 |

(Continued)

FOREIGN PATENT DOCUMENTS

| | | |
|---|---|---|
| JP | 11-345095 | 12/1999 |
| JP | 2006-79418 | 3/2006 |
| JP | 2009-211619 | 9/2009 |

*Primary Examiner* — Joshua P Lottich
(74) *Attorney, Agent, or Firm* — Staas & Halsey LLP

(57) ABSTRACT

A storage control device includes a storage unit and a processor. The storage unit is configured to store therein a first score calculated for a first storage device. The processor is configured to add, upon detecting an event occurred in the first storage device, points corresponding to the event to the first score. The processor is configured to determine upon the addition, based on the first score and a second score, whether a sign of failure of the first storage device is detected. The second score is calculated for a first redundant unit of storage devices including the first storage device.

18 Claims, 17 Drawing Sheets

(56) References Cited

U.S. PATENT DOCUMENTS

| | | | |
|---|---|---|---|
| 2005/0283655 A1* | 12/2005 | Ashmore | G06F 11/004 714/6.32 |
| 2006/0069947 A1 | 3/2006 | Takahashi et al. | |
| 2006/0090098 A1* | 4/2006 | Le | G06F 11/008 714/6.12 |
| 2008/0010503 A1* | 1/2008 | Cashman | G06F 11/1092 714/6.12 |
| 2009/0271657 A1* | 10/2009 | McCombs | G06F 11/004 714/6.2 |
| 2013/0047028 A1* | 2/2013 | Daikokuya | G06F 11/0727 714/6.3 |
| 2014/0304548 A1* | 10/2014 | Steffan | G06F 11/1088 714/6.23 |
| 2015/0046756 A1* | 2/2015 | Sreekumaran | G06F 11/008 714/47.2 |

* cited by examiner

STORAGE CONTROL DEVICE AND METHOD FOR CONTROLLING STORAGE DEVICES

CROSS-REFERENCE TO RELATED APPLICATION

This application is based upon and claims the benefit of priority from the prior Japanese Patent Application No. 2013-185965 filed on Sep. 9, 2013, the entire contents of which are incorporated herein by reference.

FIELD

The embodiments discussed herein are related to a storage control device and a method for controlling storage devices.

BACKGROUND

With the wide distribution of information and communication technology (ICT) systems, a disk array device which uses a plurality of storage devices (hereinafter, collectively referred to as "disks") which is represented by a hard disk drive (HDD) has been widely used in recent years. In the disk array device, data are generally recorded in two or more disks in a redundant fashion using redundant arrays of inexpensive disks (RAID) technology to secure the data safety.

Here, the RAID technology refers to a technology in which a plurality of disks are combined and managed as a single virtual disk (a RAID group). In the RAID technology, levels of RAID0 to RAID6 exist according to the data arrangement on each disk and data redundancy. When a disk fails in the disk array device in which data are made redundant, data stored in the failed disk is reconstructed and stored in a replacement disk such as a spare disk, called a hot spare (HS). Such a processing is generally called a rebuild processing. The rebuild processing is performed to recover data redundancy.

A processing called a copy back returns the RAID group to a state before a disk failure. In the copy back processing, when the failed disk is replaced with a maintenance disk after the rebuild processing is completed, the data in the replacement disk is copied into the maintenance disk. When a sign of a disk failure is detected, a processing called a redundant copying may be performed to copy the data into the replacement disk before the redundancy of the RAID group is lost. The redundant copying processing has lower possibility of data loss and higher data safety than the rebuild processing.

In the processing of the rebuild, copy back, and redundant copying, the HS is used as the replacement disk provided for a backup purpose in preparation for failure of the disk in the RAID device. A self-monitoring, analysis and reporting technology (SMART) is widely used in storage devices. The SMART is a technology in which a disk performs a self-diagnosis based on a reading error occurrence rate, read and write speed, a total number of times of starting/stopping of motor, and a total energizing time since the shipment thereof so as to predict its own failure. Currently, the SMART function is provided in most of storage devices.

Hereinafter, a state in which the disk has detected the sign of failure by the SMART function is called a "SMART state". That is, the SMART state refers to a state in which the disk is about to fail. A determination as to whether the disk is in the SMART state is made based on a known diagnosis method.

Related techniques are disclosed in, for example, Japanese Laid-Open Patent Publication No. 2006-79418, Japanese Laid-Open Patent Publication No. 2009-211619, and Japanese Laid-Open Patent Publication No. 11-345095.

In a state in which a single disk is in a degraded state (that is, in a non-redundant state) in the RAID, data reading becomes disabled if another disk becomes degraded or a media error is detected, and thus data is lost. For example, when the redundant copying is started but a disk that is about to fall into the SMART state exists separately in the same RAID group, the probability of redundant copying failure is high due to an influence by the disk that is about to fall into the SMART state. When the redundant copying fails, data is lost.

When the redundant copying is started but a disk that is about to fall into the SMART state exists separately in the same RAID group, the disk may be degraded first before a disk that has already been in the SMART state is degraded. In this case, the redundant copying fails with high probability and thus, data is lost. As described above, when a disk which is in an abnormal state equivalent to or closer to the SMART state exists in addition to the disk that has already been in the SMART state, a risk of a multiple failure may not be solved.

Here, the multiple failure refers to a case where a plurality of disks fail in a single RAID group. To address the multiple failure, for example, a method may be considered in which all the disks constituting the RAID are checked at a predetermined time interval and the data in the disk having the highest probability of failure is escaped to the HS. However, in such a method, since the escape of data is performed at a predetermined time interval, it is unable to avoid data loss in a case where, for example, two disks fail consecutively.

SUMMARY

According to an aspect of the present invention, provided is a storage control device including a storage unit and a processor. The storage unit is configured to store therein a first score calculated for a first storage device. The processor is configured to add, upon detecting an event occurred in the first storage device, points corresponding to the event to the first score. The processor is configured to determine upon the addition, based on the first score and a second score, whether a sign of failure of the first storage device is detected. The second score is calculated for a first redundant unit of storage devices including the first storage device.

The objects and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, a storage control device and a method for controlling storage device according to the embodiments will be described with reference to accompanying drawings. Embodiments to be described are illustrative only and are not intended to exclude application of various modified examples and technologies that are not specified in the embodiments. That is, the embodiments may be implemented by variously modifying (e.g., combining embodiments and modified examples) the embodiments without departing from a gist of the present disclosure.

First Embodiment

First, a configuration of a disk array device according to a first embodiment will be described.

Figure 1:
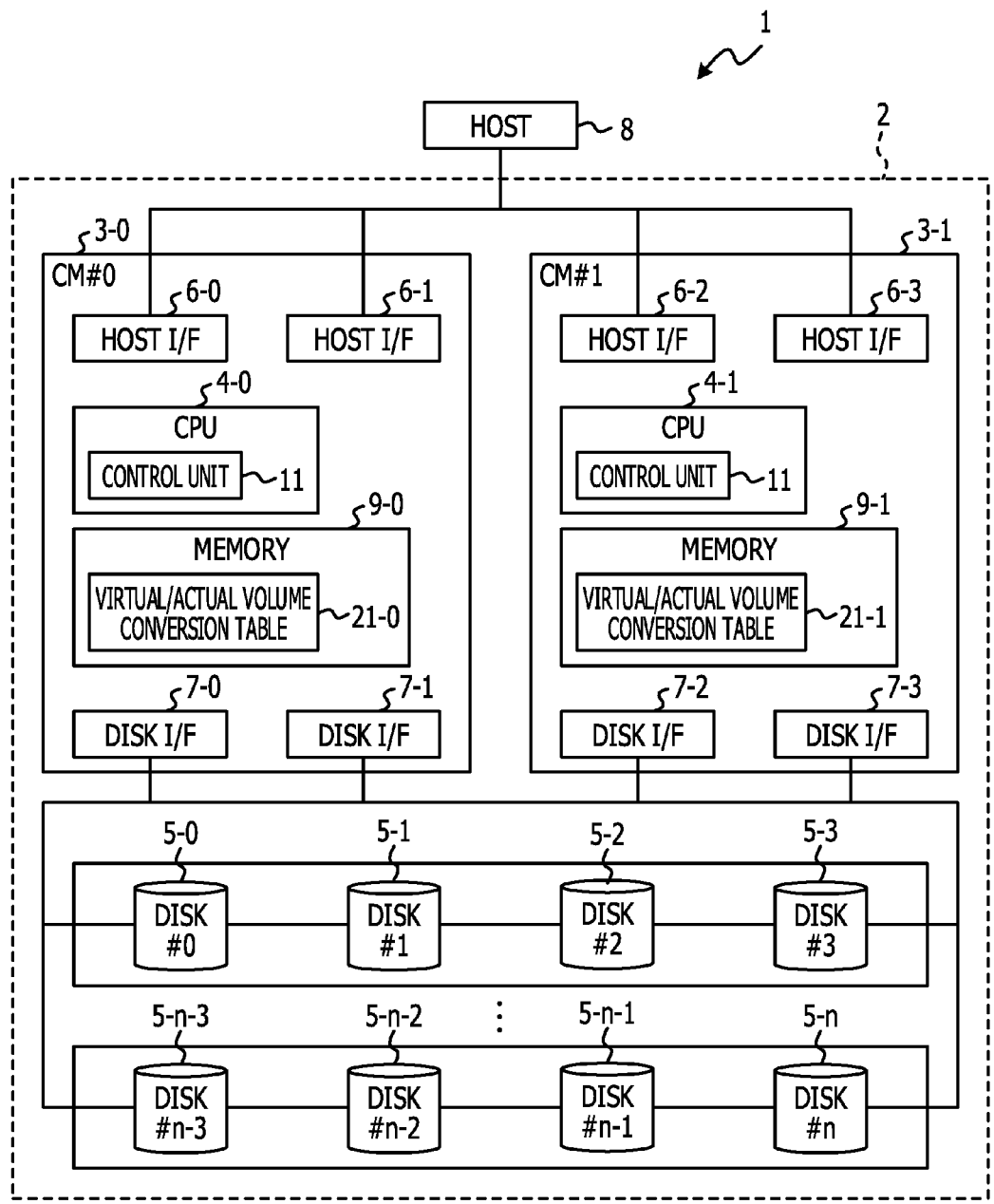
FIG. 1 is a diagram illustrating a hardware configuration of an information processing system provided with a disk array device according to a first embodiment.

FIG. 1 is a diagram illustrating a hardware configuration of an information processing system 1 provided with a disk array device 2 according to a first embodiment.

The information processing system 1 includes a host device 8 and the disk array device 2. In the information processing system 1, the host device 8 and the disk array device 2 are connected with each other through, for example, a storage area network (SAN).

The host device 8 is a computer (information processing device) provided with, for example, a server function, and transmits and receives various data, such as a small computer system interface (SCSI) command or a response, to and from the disk array device 2 using a storage connection protocol. The host device 8 transmits a disk access command (input/output (I/O) command), such as a read/write command, to the disk array device 2 to write and read data to and from a storage area provided by the disk array device 2.

The disk array device 2 provides a storage area to the host device 8 and is communicably connected with the host device 8 through a local area network (LAN) or SAN. The disk array device 2 includes control modules (CMs) 3-0 and 3-1 and disks (storage devices) 5-0, 5-1, . . . , 5-n (n is an integer number equal to or greater than three). The CMs 3-0 and 3-1 are controllers that control the operations performed in the disk array device 2, and receive the I/O command, such as the read/write command, from the host device 8 to perform various controls.

The CMs 3-0 and 3-1 are duplicated. The CM 3-0 normally functions as a primary CM to control the CM 3-1, which is a secondary CM, thereby managing the entire operation of the disk array device 2. However, when the CM 3-0 fails, the CM 3-1 functions as the primary CM and takes over the operation of the CM 3-0. The CM 3-0 includes host interfaces (I/Fs) 6-0 and 6-1, disk I/Fs 7-0 and 7-1, a central processing unit (CPU) 4-0, and a memory 9-0.

The host I/Fs 6-0 and 6-1 are interfaces for connecting the host device 8 with the CM 3-0 via, for example, the SAN. The host I/Fs 6-0 and 6-1 connect the host device 8 with the CM 3-0 using various communication standards, such as a fibre channel (FC), Internet SCSI (iSCSI), Serial Attached SCSI (SAS), fibre channel over Ethernet (FCoE), or Infiniband. The host I/Fs 6-0 and 6-1 are duplicated such that, even when one of the host I/Fs 6-0 and 6-1 fails, the CM 3-0 may continuously operate normally as long as the other of the host I/Fs 6-0 and 6-1 operates normally.

The disk I/Fs 7-0 and 7-1 are interfaces that connect the CM 3 with the disks 5-0, 5-1, . . . , and 5-n (to be described later) using, for example, the SAS. The disk I/Fs 7-0 and 7-1 are, for example, Expanders or I/O Controllers (IOCs). The disk I/Fs 7-0 and 7-1 control data exchange with the disks 5-0, 5-1, . . . , and 5-n. The disk I/Fs 7-0 and 7-1 are duplicated such that even when one of the disk I/Fs 7-0 and 7-1 fails, the CM 3-0 may continuously operate normally as long as the other of the disk I/Fs 7-0 and 7-1 operates normally.

The CPU 4-0 is a processing device that performs various controls and operations, and implements various functions by executing a program stored in, for example, a read-only memory (ROM) (not illustrated). The CPU 4-0 executes the program to function as a control unit (storage control device) 11 to be described later with reference to FIG. 2. The memory 9-0 stores therein a program executed by the CPU 4-0 or various data used for execution and data obtained by the operation of the CPU 4-0. The memory 9-0 also functions as a storage unit of a virtual/actual volume conversion table 21-0. For example, a random access memory (RAM) may be used as the memory 9-0.

The virtual/actual volume conversion table 21-0 is a table in which an address of a virtual volume of the disk array device 2 is mapped to a physical address (actual address) of the disks 5-0, 5-1, . . . , and 5-n. Components such as the host I/Fs 6-0 and 6-1 and the CPU 4-0 in the CM 3-0 are connected with each other using, for example, Peripheral Component Interconnect Express (PCIe).

The CM 3-1 includes host I/Fs 6-2 and 6-3, disk I/Fs 7-2 and 7-3, a CPU 4-1 and a memory 9-1. The host I/Fs 6-2 and 6-3 are interfaces for connecting the host device 8 with the CM 3-1 via, for example, the SAN. The host I/Fs 6-2 and 6-3 connect the host device 8 with the CM 3-1 using various communication standards, such as the FC, iSCSI, SAS, FCoE, or Infiniband. The host I/Fs 6-2 and 6-3 are duplicated such that even when one of the host I/Fs 6-2 and 6-3 fails, the CM 3-1 may continuously operate normally as long as the other of the host I/Fs 6-2 and 6-3 operates normally.

The disk I/Fs 7-2 and 7-3 are interfaces that connect the CM 3-1 with the disks 5-0, 5-1, . . . , and 5-n (to be described later) using, for example, the SAS. The disk I/Fs 7-2 and 7-3 are, for example, the Expanders or IOCs. The disk I/Fs 7-2 and 7-3 control data exchange with the disks 5-0, 5-1, . . . , and 5-n. The disk I/Fs 7-2 and 7-3 are duplicated such that even when one of the disk I/Fs 7-2 and 7-3 fails, the CM 3-1 may continuously operate normally as long as the other of the disk I/Fs 7-2 and 7-3 operates normally.

The CPU 4-1 is a processing device that performs various controls and operations, and implements various functions by executing a program stored in, for example, a ROM (not illustrated). The CPU 4-1 executes the program to function as the control unit (storage control device) 11 to be described later with reference to FIG. 2. The memory 9-1 stores therein a program executed by the CPU 4-1 or various data used for execution and data obtained by the operation of the CPU 4-1. The memory 9-1 also functions as a storage unit of a virtual/actual volume conversion table 21-1. For example, a RAM may be used as the memory 9-1.

The virtual/actual volume conversion table 21-1 is a table in which an address of a virtual volume of the disk array device 2 is mapped to a physical address (actual address) of the disks 5-0, 5-1, . . . , and 5-n. Components such as the host I/Fs 6-2 and 6-3 and the CPU 4-1 in the CM 3-1 are connected with each other using, for example, the PCIe.

The disks 5-0, 5-1, . . . , and 5-n are disk drives that provide a storage area. The disk array device 2 combines and causes a plurality of disks 5-0, 5-1, . . . , and 5-n to function as a logical volume. In the description, regarding reference numerals indicating CMs, reference numeral "3-0" or "3-1" is used when one of the CMs is specified, and reference numeral "3" is used when an arbitrary CM is indicated.

In the description, regarding reference numerals indicating the CPUs, reference numeral "4-0" or "4-1" is used when one of the CPUs is specified, and the reference numeral "4" is used when an arbitrary CPU is indicated. In the description, regarding reference numerals indicating the disks, reference numeral "5-0", "5-1", . . . , or "5-n" is used when one of the disks is specified, and reference numeral "5" is used when an arbitrary disk is indicated.

In the description, regarding reference numerals indicating the host I/Fs, reference numeral "6-0", "6-1", "6-2" or "6-3" is used when one of the host I/Fs is specified, and reference numeral "6" is used when an arbitrary host I/F is indicated. In the description, regarding reference numerals indicating the disk I/Fs, reference numeral "7-0", "7-1", "7-2", or "7-3" is used when one of the disk I/Fs is specified, and reference numeral "7" is used when an arbitrary disk I/F is indicated.

In the description, regarding the reference numerals indicating the memories, reference numeral "9-0" or "9-1" is used when one of the memories is specified, and reference numeral "9" is used when an arbitrary memory is indicated. In the description, regarding reference numerals indicating the virtual/actual volume conversion tables, reference numeral "21-0" or "21-1" is used when one of the virtual/actual volume conversion tables is specified, and reference numeral "21" is used when an arbitrary virtual/actual volume conversion table is indicated.

Figure 2:
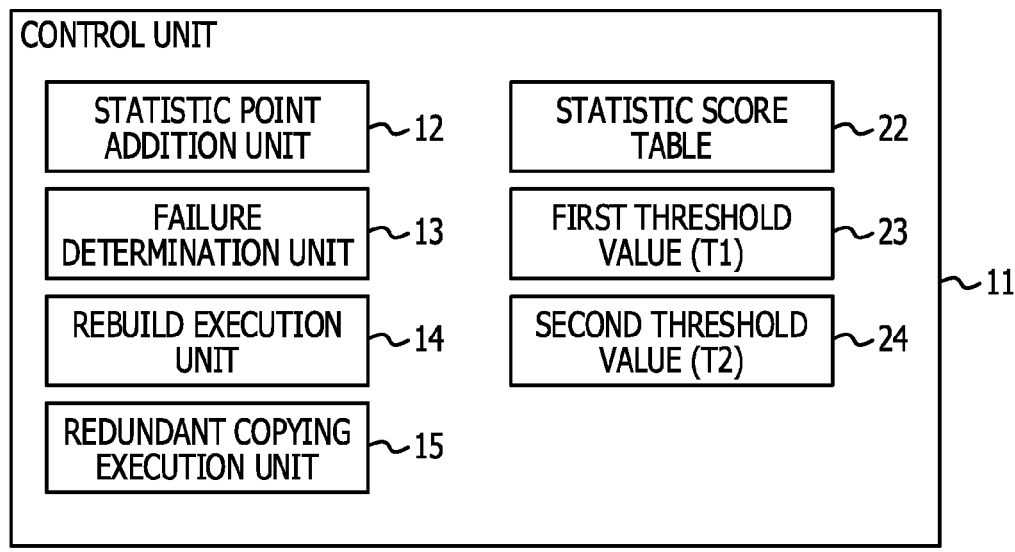
FIG. 2 is a diagram illustrating a functional configuration of a control unit of a disk array device according to a first embodiment.

Subsequently, a functional configuration of the control unit 11 will be described. FIG. 2 is a diagram illustrating a functional configuration of the control unit 11 of the disk array device 2 according to the first embodiment. The control unit 11 monitors the state of each disk 5 to perform statistic point addition thereon and performs the redundant copying based on a statistic score for each single disk 5 and a statistic score for each redundant unit (or a RAID group unit).

Here, the term, "statistic score" refers to a score obtained for each disk 5 by adding points corresponding to a certain event when the event occurs in the disk 5. Further, the expression, "perform statistic point addition" refers to adding (accumulating) the points corresponding to the event to the statistic score for the disk 5 when the event occurs. For example, when a read or write error occurs on a disk 5, points corresponding to the read or write error are added to the statistic score for the disk 5.

Here, the term, "a statistic score for a redundant unit (or a RAID group unit)" refers to a statistic score for a plurality of disks 5 configured in a redundant fashion, as a whole. A method of calculating a statistic score for a redundant unit will be described later. The control unit 11 includes a statistic point addition unit (calculation unit) 12, a failure determination unit (determination unit) 13, a rebuild execution unit 14, a redundant copying execution unit (recovery unit) 15, a statistic score table (statistical values) 22, a first threshold value (T1) 23, and a second threshold value (T2) 24.

When an event that influences the statistic score occurs at any of the disks 5, the statistic point addition unit 12 determines whether the event is an immediate degradation triggering event. The immediate degradation triggering event refers to an event such that the disk 5 should be immediately degraded and rebuilt due to an unrecoverable error of the disk 5. When it is determined that the event is an immediate degradation triggering event, the statistic point addition unit 12 instructs the rebuild execution unit 14 to immediately degrade the disk 5 and perform the rebuild processing. When it is determined that the event is not an immediate degradation triggering event, the statistic point addition unit 12 adds the points corresponding to the event to the statistic score for the disk 5 at which the event has occurred to update the statistic score table 22 (described later).

A condition of determination as to whether an event is an immediate degradation triggering event is stored in advance in a table (not illustrated) or the like by a system manager, for example. Hereinafter, an event that influences the statistic score for the disk 5 is referred to as a "statistic point addition target event". Since the statistic point addition target event and the method of calculating the statistic score are known in related arts, descriptions thereof will be omitted.

When the statistic score for a disk 5 is updated, the failure determination unit 13 determines whether to start the redundant copying by the redundant copying execution unit 15 based on the statistic score for the disk 5 alone and the statistic score for a redundant unit to which the disk 5 belongs. Specifically, the failure determination unit 13 compares the statistic score for the disk 5 alone with a first threshold value (T1) 23, and causes the redundant copying of the disk 5 to be performed when it is determined that the statistic score for the disk 5 alone exceeds the first threshold value (T1) 23.

When it is determined that the statistic score for the disk 5 alone does not exceed the first threshold value 23, the failure determination unit 13 determines whether the statistic score for the redundant unit which includes the disk 5, at which the statistic point addition target event has occurred, exceeds the second threshold value (T2) 24. When it is determined that the statistic score for the redundant unit exceeds the second threshold value 24, the failure determination unit 13 causes the redundant copying of the disk 5 to be performed. The rebuild execution unit 14 restores data of the disk 5 in a hot spare (HS) 5 to perform the rebuild processing. In this case, the rebuild execution unit 14 performs the rebuild processing using a known rebuild method. Since the rebuild method is known, descriptions thereof will be omitted.

The redundant copying execution unit 15 performs the redundant copying of a disk 5. At this time, the redundant copying execution unit 15 performs the redundant copying processing using a known redundant copying method. Since the redundant copying method is known, descriptions thereof will be omitted. When a disk other than the copied disk 5 is degraded during the redundant copying, the redundant copying execution unit 15 stops the redundant copying and switches into the rebuild processing.

When the redundant copying by the redundant copying execution unit 15 is normally completed so that the copy back is also terminated, the failure determination unit 13 checks for the statistic score again without waiting the next statistic point addition. When any of start conditions (described later) of redundant copying is satisfied, the failure determination unit 13 starts the redundant copying. The statistic score table 22 is a table configured to maintain statistic scores for respective disks 5 and statistic scores for respective redundant units in the disk array device 2. The statistic score table 22 is stored in, for example, the memory 9.

The first threshold value (T1) 23 is a numerical value that prescribes a first start condition of the redundant copying. The failure determination unit 13 compares the statistic score for a disk 5 with the first threshold value 23. When the statistic score for the disk 5 exceeds the first threshold value 23, the failure determination unit 13 causes the redundant copying execution unit 15 to perform the redundant copying. The first threshold value 23 is set to an arbitrary value by, for example, a manager of the information processing system 1 and stored in the memory 9.

The second threshold value (T2) 24 is a numerical value that prescribes a second start condition of the redundant copying. The failure determination unit 13 compares the statistic score for a redundant unit to which the disk 5 belongs. When the statistic score for the redundant unit exceeds the second threshold value 24, the failure determination unit 13 causes the redundant copying execution unit 15 to perform the redundant copying of, for example, a disk 5 having the largest statistic score for the redundant unit. When the statistic scores for a plurality of disks 5 are equal to each other, the failure determination unit 13 selects a recovery target disk 5 based on, for example, the operation (incorporation) period of time of the disk 5.

The second threshold value 24 is set to an arbitrary value by, for example, the manager of the information processing system 1 and stored in the memory 9. In some cases, a plurality of second threshold values 24 may be used depending on, for example, the configuration of the disk array device 2. Examples in which a plurality of second threshold values 24 are used will be described later as first and third modified examples of the first embodiment.

Subsequently, the operation of the control unit 11 of the disk array device 2 according to the first embodiment will be described.

Figure 3:
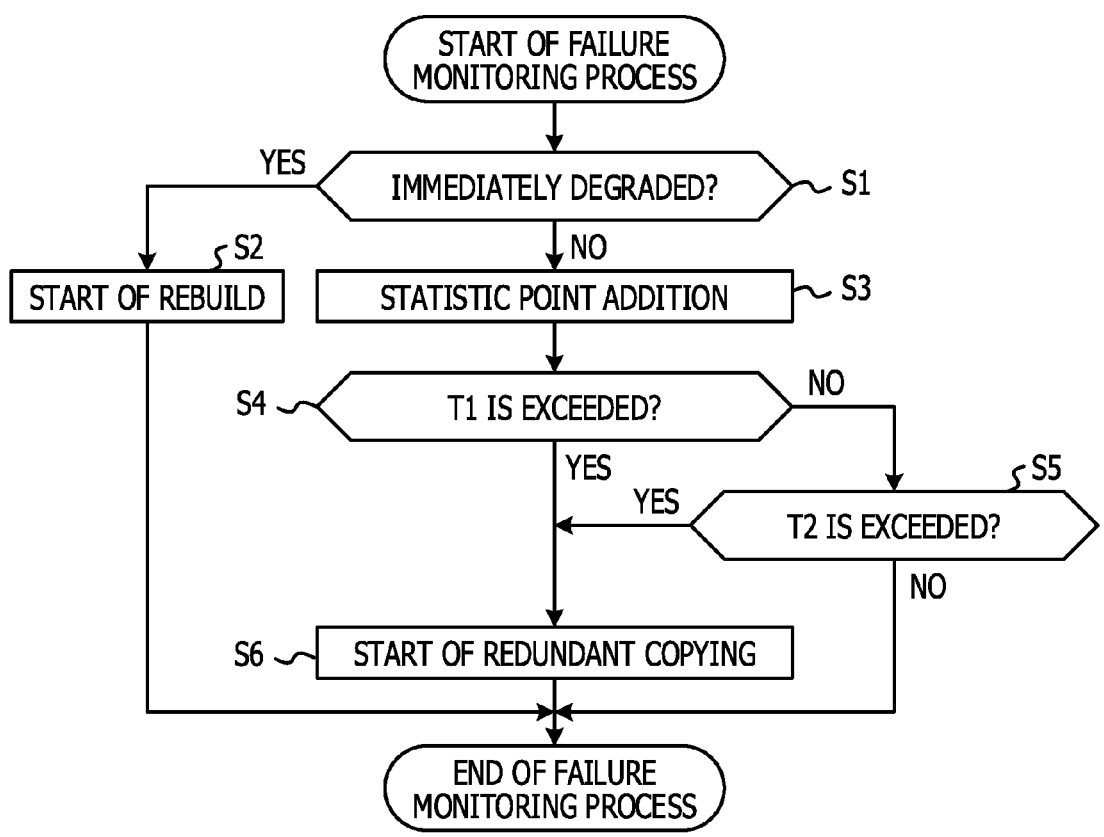
FIG. 3 is a flowchart illustrating a failure monitoring process performed by a control unit according to a first embodiment.

FIG. 3 is a flowchart (S1 to S6) illustrating a failure monitoring process performed by the control unit 11 according to the first embodiment. The failure monitoring process is performed in a case where the statistic point addition target event has occurred in any of the disks 5 in the disk array device 2. At S1, the statistic point addition unit 12 of the control unit 11 determines whether the event is an immediate degradation triggering event.

When it is determined that the event occurred in the disk 5 is an immediate degradation triggering event ("YES" at S1), the rebuild execution unit 14 performs the rebuild processing of the disk 5 at S2 and ends the failure monitoring process.

When it is determined that the event occurred in the disk 5 is not an immediate degradation triggering event ("NO" at S1), the statistic point addition unit 12 performs the statistic point addition according to the event which has occurred in the disk 5 to update the statistic score table 22 at S3. At S4, the failure determination unit 13 determines whether the statistic score for the disk 5 at which the statistic point addition target event has occurred exceeds the first threshold value (T1) 23.

When it is determined that the statistic score for the disk 5 exceeds the first threshold value 23 ("YES" at S4), the failure monitoring process proceeds to S6 at which the redundant copying of the disk 5 is performed. When it is determined that the statistic score for the disk 5 does not exceed the first threshold value 23 ("NO" at S4), the failure determination unit 13 determines whether the statistic score for a redundant unit to which the disk 5 belongs exceeds the second threshold value (T2) 24 at S5.

When it is determined that the statistic score for the redundant unit does not exceed the second threshold value 24 ("NO" at S5), the failure monitoring process is ended. When it is determined that the statistic score for the redundant unit exceeds the second threshold value 24 ("YES" at S5), the failure monitoring process proceeds to S6. At S6, the failure determination unit 13 causes the redundant copying execution unit 15 to perform the redundant copying of the disk 5 and the failure monitoring process is ended.

As described above, the statistic point addition unit 12 of the storage control device 11 according to the first embodiment performs the statistic point addition for the disk 5 when the error of the disk 5 occurs. The failure determination unit 13 monitors the sign of failure of the disk 5 using a statistic score for a redundant unit, in addition to a statistic score for a single disk 5. When the sign of failure of the disk 5 is detected, the failure determination unit 13 causes the redundant copying execution unit 15 to perform the redundant copying of the disk 5 for which the sign of failure is detected. Accordingly, data redundancy is ensured to enhance the reliability of the disk array device 2.

As described above, even when the statistic score for a single disk 5 does not exceed the first threshold value 23, the storage control device 11 according to the first embodiment may monitor the sign of disk failure in a redundant unit so as to avoid the risk of the multiple failure more reliably. In contrast, in a conventional disk array device, the sign of the disk failure is monitored by disk unit and thus, the statistic scores for other disks 5 in the same RAID group are not considered at all. It is considered that a matter to be considered first due to characteristics of RAID is to secure the redundancy. The redundancy is secured in the storage control device 11 according to the first embodiment.

The failure determination unit 13 according to the first embodiment determines whether a statistic score exceeds a threshold value each time when an error occurs and thus, the redundant copying may be performed at a more optimal timing. Since a statistic score for a redundant unit is used together with a statistic score for a single disk 5 by the failure determination unit 13, when the statistic score for the redundant unit exceeds a preset value, the redundant copying may be started even in a case where the start condition of redundant copying is not satisfied in the single disk 5.

In the storage control device 11 according to the first embodiment, an occurrence of multiple failure may be predicted in the disk array device 2 to perform the redundant copying to avoid data loss.

As a first modified example of the first embodiment, the determination of the statistic score for a redundant unit at S5 of FIG. 3 described above may be performed in two stages.

Figure 4:
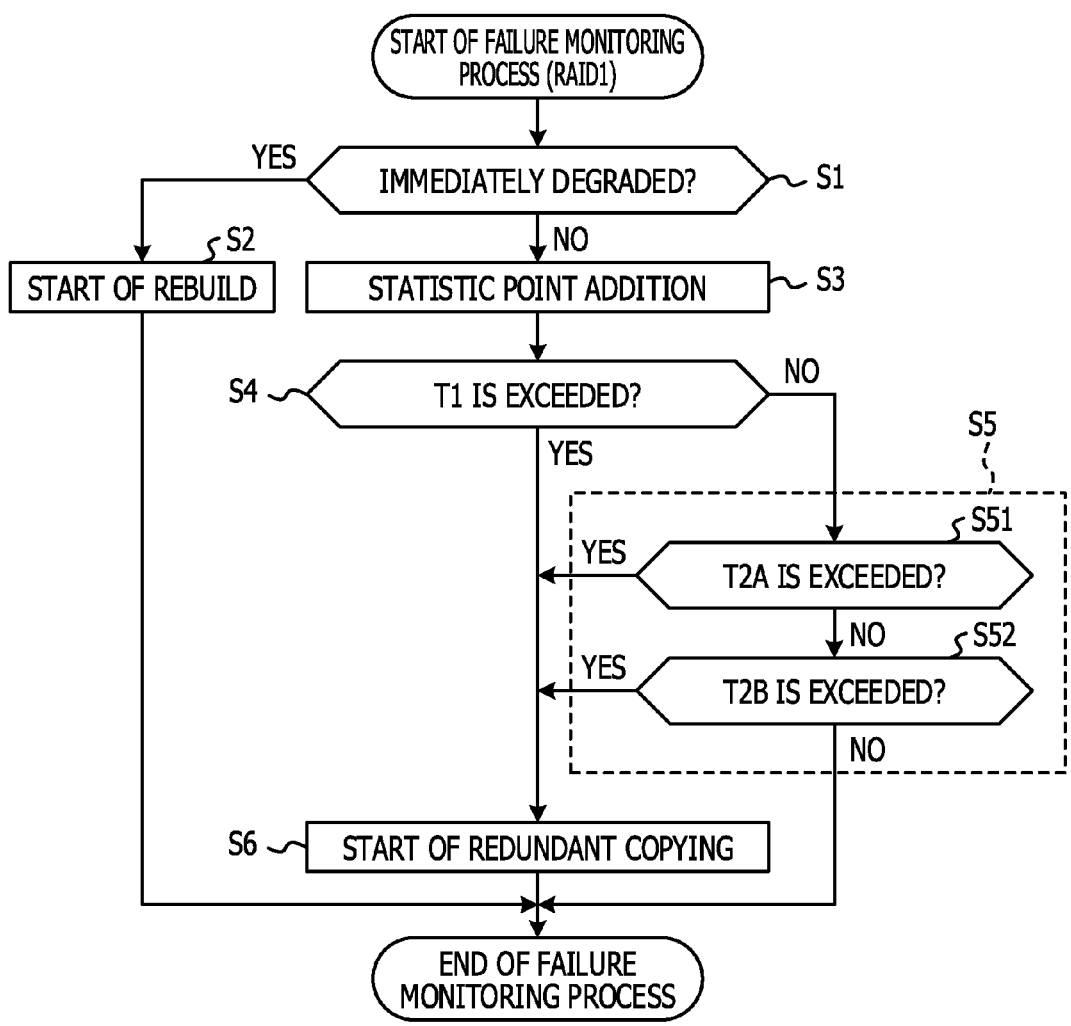
FIG. 4 is a flowchart illustrating a failure monitoring process performed by a control unit as a first modified example of a first embodiment.

FIG. 4 is a flowchart (S1 to S4, S6, S51, and S52) illustrating a failure monitoring process performed by the control unit 11 as a first modified example of the first embodiment.

Here, it is assumed that the configuration of the disk array device 2 corresponds to RAID1. The degree of redundancy of RAID1 is 2 (two). Thus, when one of the disks 5 is degraded and the other of the disks 5 also becomes degraded, double failure occurs which may cause data loss.

In this example, as for the second conditions with respect to the statistic score for a redundant unit, the failure determination unit 13 uses the following conditions: "whether the statistic scores for both of the two disks 5 constituting the redundancy exceed a threshold value T2A?" and "whether a total of the statistic scores for two disks 5 constituting the redundancy exceeds a threshold value T2B?". That is, the threshold value T2A and the threshold value T2B are used in place of the second threshold value 24 of FIG. 1 to FIG. 3.

In the first modified example of the first embodiment of FIGS. 4, S51 and S52 in the flow surrounded by a broken line correspond to S5 of FIG. 3. The processing of S1 to S4 and S6 of FIG. 4 are the same as the corresponding processing of FIG. 3 and thus, descriptions thereof will be omitted. At S51, the failure determination unit 13 determines whether the statistic scores for both of two disks 5 constituting the redundancy exceed the threshold value T2A.

Neither of the two disks 5 satisfies the start condition of redundant copying for a single disk 5, that is, T1 is not exceeded. However, if both of the two disks 5 have high statistic scores and the error occurs consecutively in both of the two disks 5, the disks may fall into the double failure which may cause data loss. Accordingly, when it is determined that the statistic scores for both of the two disks 5 constituting redundancy exceed the threshold value T2A ("YES" at S51), the process proceeds to S6 to perform the redundant copying of the target disk 5.

For example, it is assumed that the threshold value T2A is 80% of the first threshold value 23. In this case, when the first threshold value 23 is set to 255 points, the threshold value T2A becomes 204 points. When the statistic scores for both of the two disks 5 exceeds 204 points, the failure determination unit 13 causes the redundant copying execution unit 15 to perform the redundant copying with respect to the disk 5 having the largest statistic score for a single disk 5. The value of "80% of the first threshold value (T1) 23" as the threshold value T2A described above is illustrative only and any value may be used as long as the value is lower than the value of T1 used in comparison at S4, and the value may be increased or decreased according to operations of the disk array device 2.

Figure 5:
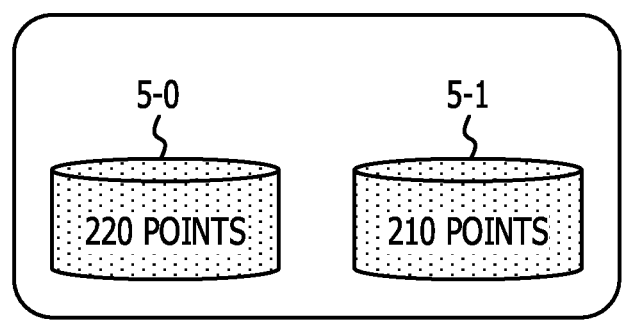
FIG. 5 is a diagram illustrating an example of statistic scores for disks in a RAID1 configuration.

FIG. 5 is a diagram illustrating an example of statistic scores for the disks 5 in a RAID1 configuration. For example, assuming that the first threshold value 23 is set to 255 points, the failure determination unit 13 causes the redundant copying execution unit 15 to perform the redundant copying in a case where the statistic scores for both of the two disks 5 exceed 204 points (255 points×0.8=204 points). In the example of FIG. 5, the statistic scores for disk 5-0 and disk 5-1 are 220 points and 210 points, respectively, and thus, the statistic scores for both of the two disks 5 exceed 204 points.

In the example of FIG. 5, the statistic score for each of two disks 5 does not reach 255 points which corresponds to the first threshold value T1 and thus, the start condition of redundant copying at S4 is not satisfied. However, the statistic scores for a redundant unit satisfy the start condition of redundant copying at S51 and thus, the redundant copying is started. When it is determined that at least one of the statistic scores for two disks 5 constituting redundancy does not exceed the threshold value T2A ("NO" at S51), the failure determination unit 13 determines whether a total of the statistic scores for the two disks 5 constituting the redundancy exceeds the threshold value T2B at S52.

For example, it is assumed that the threshold value T2B is 70% of twice the first threshold value 23. In this case, when the first threshold value 23 is set to 255 points, the threshold value T2B becomes 357 points. When a total of the statistic scores for the two disks 5 exceeds 357 points, the failure determination unit 13 causes the redundant copying execution unit 15 to perform the redundant copying of the disk 5 having the largest statistic scores for a single disk 5.

Figure 6:
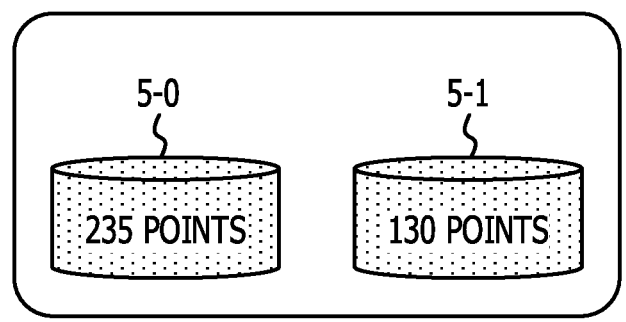
FIG. 6 is a diagram illustrating an example of statistic scores for disks in a RAID1 configuration.

FIG. 6 is a diagram illustrating another example of the statistic scores for the disks 5 in the RAID1 configuration. In the example of FIG. 6, the statistic scores for the disk 5-0 is 235 points and the statistic scores for the disk 5-1 is 130 points and thus, a total of the statistic scores for the two disks 5 becomes 365 points (235 points+130 points=365 points), exceeding 357 points of the threshold value T2B. In the example of FIG. 6, the statistic score for each of the disks 5 does not reach 255 points that is the first threshold value T1 and thus, the start condition of redundant copying at S4 is not satisfied. Further, since the statistic score for the disk 5-1 does not reach 204 points that is the threshold value T2A, the start condition of redundant copying at S51 is not satisfied. However, the statistic score for the redundant unit satisfies the start condition of redundant copying at S52 and thus, the redundant copying is started.

The value of "70% of twice the first threshold value 23" as the threshold value T2B described above is illustrative only and any value may be used as long as the value is lower than twice the value of T2A used in comparison at S51, and the value may be increased or decreased according to operations of the disk array device 2. When it is determined that a total of the statistic scores for two disks 5 constituting redundancy does not exceed the threshold value T2B ("NO" at S52) at S52, the failure monitoring process is ended.

When it is determined that a total of the statistic scores for two disks 5 constituting redundancy exceeds the threshold value T2B ("YES" at S52), the failure monitoring process proceeds to S6. The failure determination unit 13 performs the determination of the statistic score for a redundant unit in the order of S51 and S52. This is because it is considered that a risk of the occurrence of a failure for a case where the determination condition at S51 is satisfied is higher than that for a case where the determination condition at S52 is satisfied.

As described above, two conditions are set as the second condition based on the statistic score for a redundant unit in the first modified example of the first embodiment and thus, a determination on the condition based on the statistic score for a redundant unit may be performed more accurately.

Alternatively, as a second modified example of the first embodiment, an increase or a presence of an increasing tendency of the statistic scores for the disks 5 constituting the redundancy may be used in place of the determination conditions at S51 and S52 of FIG. 4.

Figure 7:
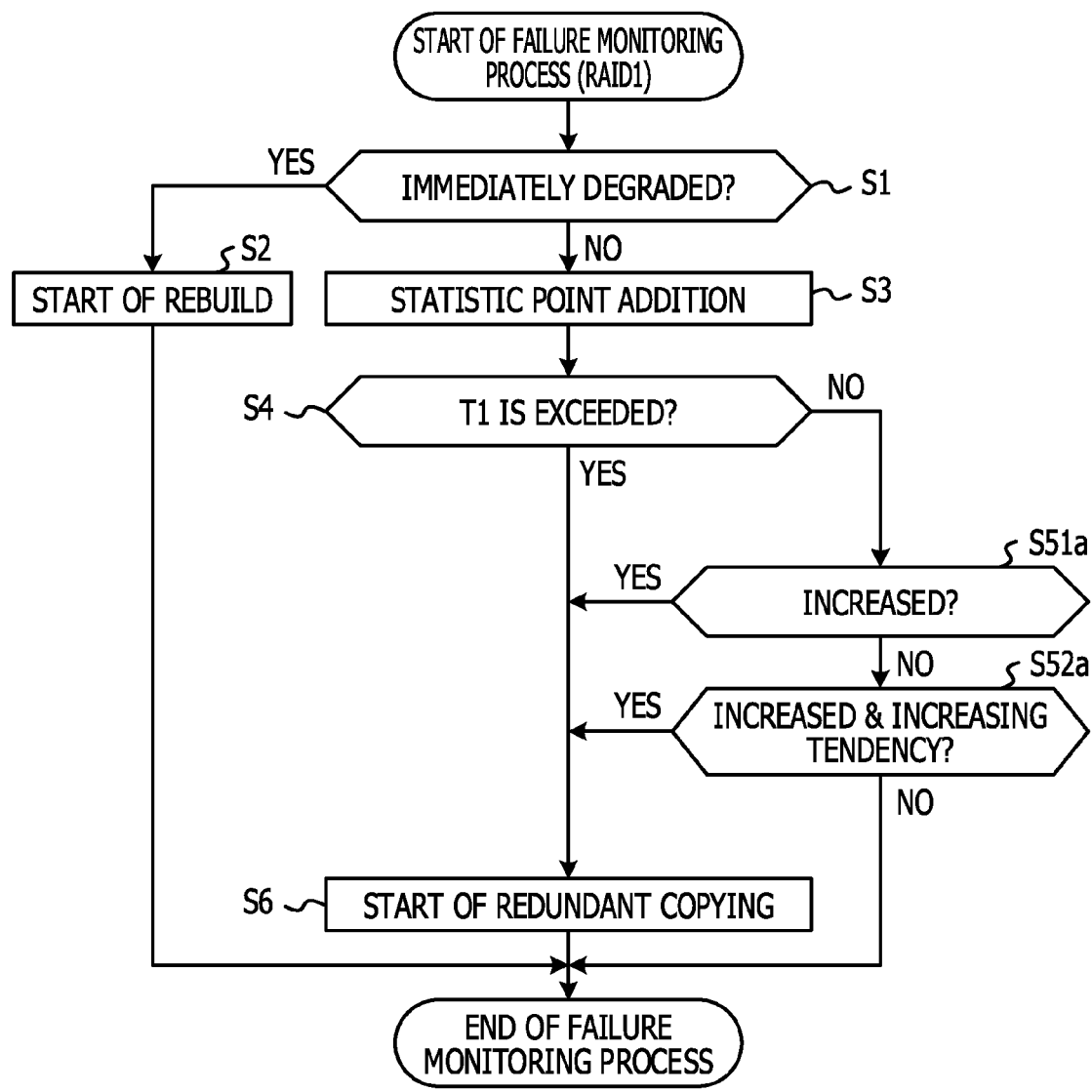
FIG. 7 is a flowchart illustrating a failure monitoring process performed by a control unit as a second modified example of a first embodiment.

Here, the expression "the statistic score increases" indicates, for example, that a variation of the statistic score exceeds a predetermined value. Further, the expression "the statistic score is in an increasing tendency" indicates, for example, that a differential value of the statistic score is a positive value. FIG. 7 is a flowchart (S1 to S4, S6, S51a and S52a) illustrating a failure monitoring process performed by the control unit 11 as a second modified example of the first embodiment.

Here, it is also assumed that the configuration of the disk array device 2 corresponds to RAID1. In this example, as for the second condition based on the statistic score for a redundant unit, the failure determination unit 13 uses the following two conditions: "whether both the statistic scores for the two disks 5 constituting the redundancy are increased" and "whether the statistic score for one of the two disks 5 is increased and the statistic score for the other of two disks 5 is in an increasing tendency". That is, threshold values for a variation and a differential value of the statistic scores for the disks 5 are used as the second threshold value 24 of FIG. 3.

The processing of S1 to S4 and S6 of FIG. 7 are the same as the corresponding processing of the example of the first embodiment of FIG. 3, and thus, the descriptions thereof will be omitted. At S51a, the failure determination unit 13 determines whether the statistic scores for both of two disks 5 constituting the redundancy are increased. In this case, the failure determination unit 13 compares variations of the statistic scores for the disks 5 constituting the redundancy with a predetermined value to determine whether the statistic scores are increased.

When it is determined that the statistic scores for both of the two disks 5 constituting the redundancy are increased ("YES" at S51a), the process proceeds to S6 to perform the redundant copying of the target disk 5. When it is determined that at least one of the statistic scores for the two disks 5 constituting the redundancy is not increased at S51a ("NO" at S51a), the failure determination unit 13 determines whether the statistic score for one of the two disks 5 is increased and the statistic score for the other of the two disks 5 is in an increasing tendency at S52a. In this case, the failure determination unit 13 determines whether the statistic score for the other of the two disks 5 is in an increasing tendency depending on, for example, whether the differential value of the statistic score is a positive value.

When it is determined that the condition that the statistic score for one of the two disks 5 is increased and the statistic score for the other of the two disks 5 is in an increasing tendency is not satisfied at S52a ("NO" at S52a), the failure monitoring process is ended. When it is determined that the statistic score for one of the two disks 5 is increased and the statistic score for the other of the two disks 5 is in an increasing tendency is satisfied at S52a ("YES" at S52a), the process proceeds to S6.

As described above, in the second modified example of the first embodiment, the variation and differential value of the statistic score may be used as the second condition based on the statistic score for a redundant unit so as to more accurately determine the condition based on the statistic score for a redundant unit.

Alternatively, as a third modified example of the first embodiment, the determination of the statistic score for a redundant unit at S5 of FIG. 3 described above may be made in three stages.

Figure 8:
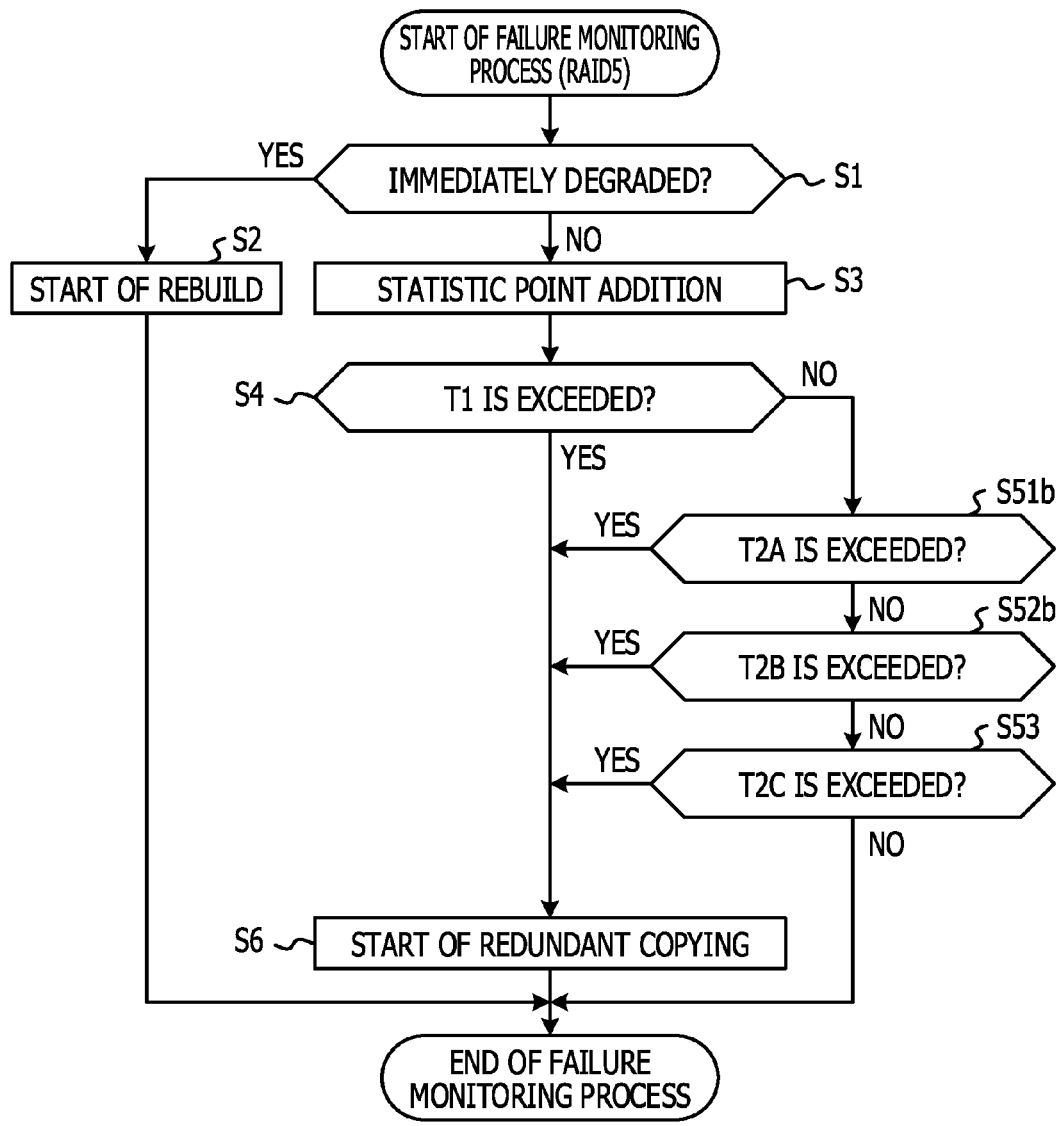
FIG. 8 is a flowchart illustrating a failure monitoring process performed by a control unit as a third modified example of a first embodiment.

FIG. 8 is a flowchart (S1 to S4, S6, S51b, S52b and S53) illustrating a failure monitoring process performed by the control unit 11 for the case of the third modified example of the first embodiment. Here, it is assumed that the configuration of the disk array device 2 corresponds to RAID5. In the case of RAID5, data is lost when two disks 5 are degraded. Thus, the determination on the condition based on the statistic score for a redundant unit, such as RAID1 illustrated in FIG. 4, may be used. However, the minimum number of configuration disks in RAID5 is three (3) and thus, the determination is made on the two disks 5 having the top two statistic scores among the disks 5.

Therefore, in this example, as a second condition based on the statistic score for a redundant unit, the failure determination unit 13 uses the following three conditions: "whether the statistic scores for both of the two disks 5 having the top two statistic scores exceed the threshold value T2A", "whether a total of the statistic scores for the two disks 5 having the top two statistic scores exceeds the threshold value T2B", and "the statistic score for an entire RAID group exceeds a threshold value T2C". That is, the threshold values T2A, T2B and T2C are used as the second threshold value 24 of FIG. 3.

The processing of S1 to S4 and S6 of FIG. 8 are the same as the corresponding processing of the example of the first embodiment of FIG. 3, and thus, the descriptions thereof will be omitted. At S51b, the failure determination unit 13 determines whether the statistic scores for both of two disks 5 having the top two statistic scores exceed the threshold value T2A. When it is determined that the statistic scores for both of the two disks 5 having the top two statistic scores exceed the threshold value T2A ("YES" at S51b), the process proceeds to S6 to perform the redundant copying of the target disk 5.

When it is determined that at least one of the statistic scores for the two disks 5 having the top two statistic scores does not exceed the threshold value T2A ("NO" at S51b), the failure determination unit 13 determines whether a total of the statistic scores for the two disks 5 having the top two statistic scores exceeds the threshold value T2B at S52b. When it is determined that the total of the statistic scores for the two disks 5 having the top two statistic scores exceeds the threshold value T2B ("YES" at S52b), the process proceeds to S6.

When it is determined that the total of the statistic scores for the two disks 5 having the top two statistic scores does not exceed the threshold value T2B ("NO" at S52b), the failure determination unit 13 determines whether the statistic score for the entire RAID group exceeds the threshold value T2C at S53. A risk of the occurrence of double failure for a case where the statistic score for the entire RAID group exceeds the threshold value T2C is lower compared to a case where the condition at S51b or S52b is satisfied. However, it is considered that the redundant copying may be desirably performed since there is a tendency that an error occurs generally.

In this case, the failure determination unit 13 may regard, for example, the total of the statistic scores for all the disks 5 of the RAID group as the statistic score for the entire RAID group. However, when the total of the statistic scores for all the disks is used for the determination without considering the number of the configuration disks, a calculation of the statistic score becomes complicated when, for example, many disks 5 (e.g., 16 disks) exist.

Therefore, in the present example, the failure determination unit 13 uses a total of the statistic scores for three disks 5, which is the minimum number of configuration disks of RAID5, as the statistic score for the entire RAID group and determines whether a total of the statistic scores for three disks 5 having the top three statistic scores exceeds a threshold value T2C. For example, it is assumed that the threshold value T2C is 60% of threefold value of the first threshold value 23. In this case, when the first threshold value 23 is set to 255 points, the threshold value T2C becomes 459 points. When a total of the statistic scores for the three disks 5 reaches 459 points, the failure determination unit 13 causes the redundant copying execution unit 15 to perform the redundant copying of the disk 5 having the largest statistic score for a single disk 5.

Figure 9:
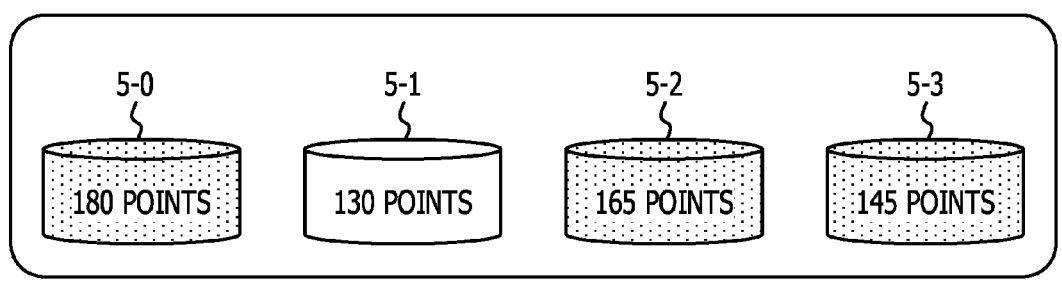
FIG. 9 is a diagram illustrating an example of statistic scores for disks in a RAID5 configuration.

The value of "60% of threefold value of the first threshold value 23" used as the threshold value T2C described above is illustrative only and any value may be used as long as the value is lower than 150% of the value of T2B used in comparison at S52b, and the value may be increased or decreased according to operations of the disk array device 2. FIG. 9 is a diagram illustrating another example of statistic scores for the disks 5 in the RAID5 configuration. In the example of FIG. 9, the failure determination unit 13 causes the redundant copying execution unit 15 to perform the redundant copying in a case where a total of statistic scores for three disks 5 reaches 459 points (255 points×3 disks×0.6). Since the statistic score for disk 5-0 is 180 points, the statistic score for disk 5-1 is 130 points, the statistic score for disk 5-2 is 165 points and the statistic score for disk 5-3 is 145, the total of statistic scores for three disks 5 having the top three statistic scores becomes 490 points, exceeding 459 points.

In the example of FIG. 9, since none of the statistic scores for respective disks 5 reaches 255 points which correspond to the first threshold value T1, the start condition of redundant copying at S4 is not satisfied. Since the statistic score for the disk 5 having the second top statistic score does not exceed 204 points which correspond to the threshold value T2A, the start condition of redundant copying at S51b is also not satisfied. Further, since the total of the statistic scores for two disks 5 having the top two statistic scores does not exceed 357 points which correspond to the threshold value T2B, the start condition of redundant copying at S52b is also not satisfied. However, the statistic score for the entire RAID group satisfies the start condition of redundant copying and thus, the redundant copying is started.

When it is determined that the statistic score for the entire RAID group does not exceed the threshold value T2C at S53 ("NO" at S53), the failure monitoring process is ended. When it is determined that the statistic score for the entire RAID group exceeds the threshold value T2C at S53 ("YES" at S53), the process proceeds to S6.

Subsequently, it is assumed that the configuration of the disk array device 2 corresponds to RAID6.

The disks 5 are triplicated in RAID6 unlike RAID1 or RAID5. Accordingly, the start condition of redundant copying varies between a case where no disk 5 is degraded and a case where one disk 5 is degraded. In the case where no disk 5 is degraded, data is lost when three disks 5 become degraded. Therefore, the failure determination unit 13 makes a determination in a similar manner as in the RAID5 illustrated at S53 of FIG. 8. However, the failure determination unit 13 is different in that the failure determination unit 13 makes a determination based on the statistic scores for four disks 5 having the top four statistic scores rather than based on the statistic scores for the three disks 5 having the top three statistic scores at S53 of FIG. 8.

For example, when a total of statistic scores for four disks 5 having the top four statistic scores exceeds a predetermined value at S53 of FIG. 8, the failure determination unit 13 causes the redundant copying execution unit 15 to perform the redundant copying with respect to the disk 5 having the largest statistic score. On the other hand, when one disk 5 is degraded and the degraded disk 5 is subjected to the rebuild processing, the rebuild processing is started and thus, the redundant copying is not started typically.

However, a case where another disk 5 becomes a SMART state during the rebuild processing of the degraded disk 5 may be considered. A determination of the statistic scores by a RAID group unit where one disk 5 is being degraded is the same as S53 of FIG. 8. The minimum number of configuration disks of RAID6 is four and the determination at S53 of FIG. 8 is also made based on the total value of three disks 5 having the top three statistic scores.

As described above, three conditions may be set as the second condition based on the statistic score for a redundant unit in the third modified example of the first embodiment so as to more accurately perform a determination on the condition based on the statistic score for a redundant unit.

Second Embodiment

Subsequently, the disk array device 2 according to a second embodiment will be described.

Figure 10:
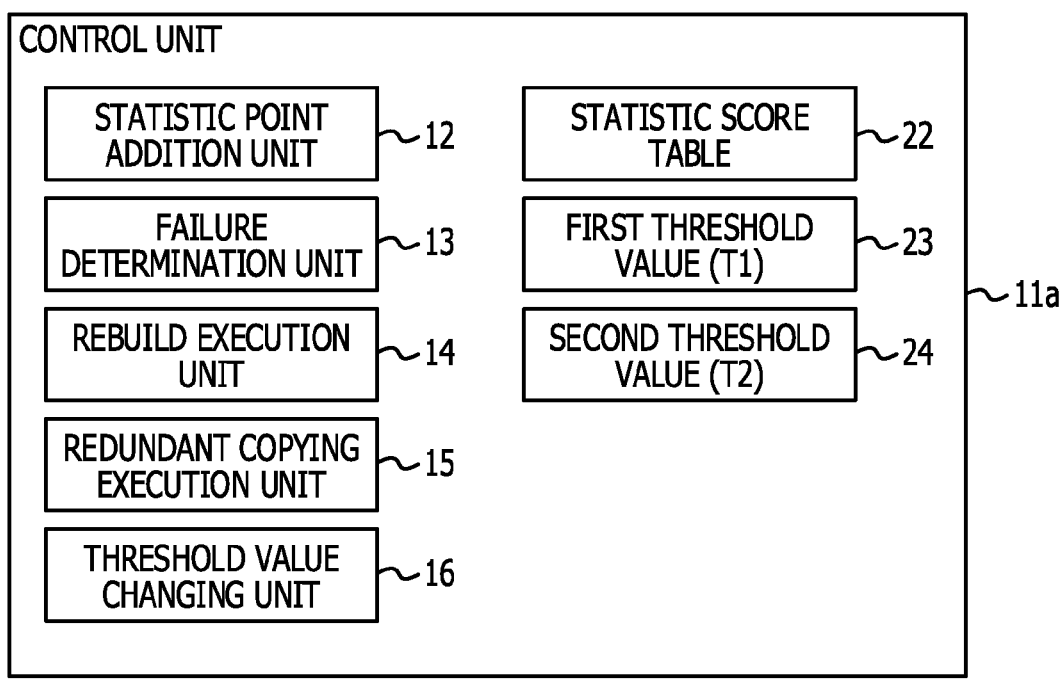
FIG. 10 is a diagram illustrating a functional configuration of a control unit of a disk array device according to a second embodiment.

The control unit of the disk array device 2 according to the second embodiment has a function of changing the first threshold value (T1) 23 in accordance with the statistic score for a redundant unit, in addition to the function of the control unit 11 of the disk array device 2 according to the first embodiment. FIG. 10 is a diagram illustrating a functional configuration of a control unit of the disk array device 2 according to the second embodiment.

A control unit 11a includes the statistic point addition unit 12, the failure determination unit 13, the rebuild execution unit 14, the redundant copying execution unit 15, the statistic score table 22, the first threshold value (T1) 23, the second threshold value (T2) 24, and a threshold value changing unit (changing unit) 16. The functions and configurations of the statistic point addition unit 12, the failure determination unit 13, the rebuild execution unit 14, the redundant copying execution unit 15, the statistic score table 22, the first threshold value 23 and the second threshold value 24 of the control unit 11a are the same as those of the respective functional units of the control unit 11 illustrated in FIG. 2 and thus, descriptions thereof will be omitted.

The threshold value changing unit 16 changes the first threshold value 23 in accordance with the statistic score for a redundant unit. Specifically, the threshold value changing unit 16 decreases the first threshold value 23 as the first start condition of redundant copying so as to ease the start condition of redundant copying if the statistic score for a redundant unit exceeds the second threshold value 24 when the failure determination unit 13 compares the statistic score for a redundant unit with the second threshold value 24. For example, when the statistic score for a redundant unit exceeds the second threshold value 24, the threshold value changing unit 16 decreases the first threshold value 23 by about 20%.

Figure 11:
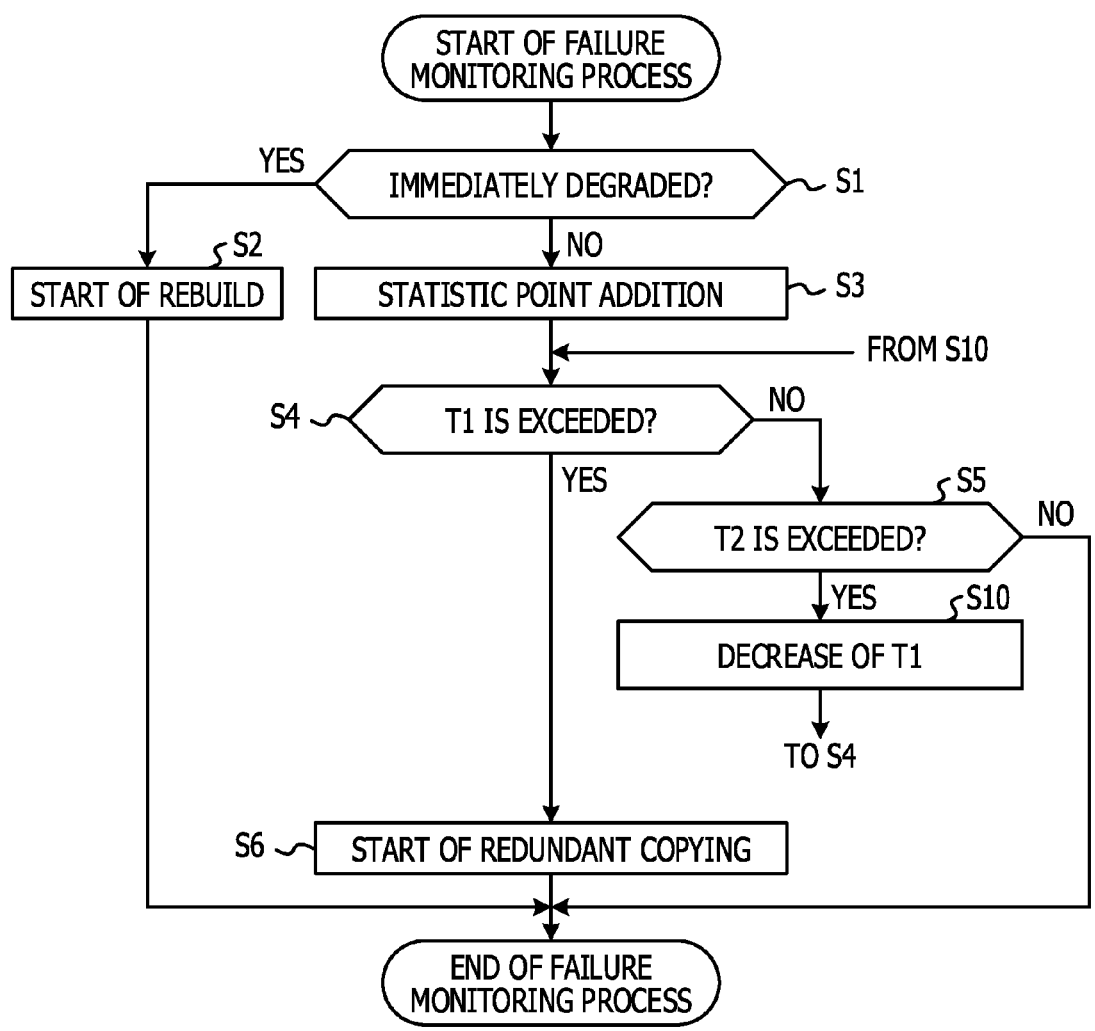
FIG. 11 is a flowchart illustrating a failure monitoring process performed by a control unit according to a second embodiment.

When one disk 5 becomes degraded, the threshold value changing unit 16 restores the threshold value of the first statistic score to an initial value. FIG. 11 is a flowchart illustrating a failure monitoring process (S1 to S6, and S10) performed by the control unit 11a according to the second embodiment. At S1, the statistic point addition unit 12 of the control unit 11a determines whether the event occurred in the disk 5 is an immediate degradation triggering event.

When it is determined that the event occurred in the disk 5 is an immediate degradation triggering event ("YES" at S1), the rebuild execution unit 14 performs the rebuild processing of the disk 5 at S2 and ends the failure monitoring process. When it is determined that the event occurred in the disk 5 is not an immediate degradation triggering event ("NO" at S1), the statistic point addition unit 12 performs the statistic point addition according to the event occurred in the disk 5 to update the statistic score table 22 at S3.

At S4, the failure determination unit 13 determines whether the statistic score for the disk 5 in which the statistic point addition target event has occurred exceeds the first threshold value (T1) 23. When it is determined that the statistic score for the disk 5 exceeds the first threshold value 23 ("YES" at S4), the process proceeds to S6 at which the redundant copying of the disk 5 is performed.

When it is determined that the statistic score for the disk 5 does not exceed the first threshold value 23 ("NO" at S4), the failure determination unit 13 determines whether the statistic score for a redundant unit to which the disk 5 belongs exceeds the second threshold value (T2) 24 at S5. When it is determined that the statistic score for the redundant unit to which the disk 5 belongs does not exceed the second threshold value 24 ("NO" at S5), the failure monitoring process is ended.

When it is determined that the statistic score for the redundant unit exceeds the second threshold value 24 ("YES" at S5), the failure determination unit 13 decreases the current first threshold value 23 by, for example, 20% at S10. Thereafter, the failure monitoring process goes back to S4. At S6, the failure determination unit 13 causes the redundant copying execution unit 15 to perform the redundant copying of the disk 5 and the failure monitoring process is ended.

As described above, when the statistic score for a redundant unit exceeds the second threshold value 24, the threshold value changing unit 16 of the control unit 11a according to the second embodiment decreases the first threshold value 23 so as to ease the start condition of redundant copying. Therefore, the control unit 11a according to the second embodiment achieves an effect that the start of the redundant copying is made easy to realize an early recovery.

Third Embodiment

Subsequently, the disk array device 2 according to a third embodiment will be described.

In the example of the first embodiment, the redundant copying is started based on the statistic score for a redundant unit, in addition to the statistic score for a single disk 5. In this case, the occurrence of competition for the redundant copying between RAID groups may be considered. Since the redundant copying is performed on a first-come and first-served basis, when the competition for the redundant copying occurs, the redundant copying for a RAID group having a higher degree of urgency may be postponed.

Accordingly, when the number of hot spare disks 5 in the disk array device 2 is smaller than the number of the required redundant copying, the control unit of the disk array device 2 according to the third embodiment compares the priorities of recovery between the RAID groups. Also, the control unit allocates the hot spare disks 5 to the RAID groups having higher degree of urgency for recovery. Hereinafter, a hot spare disk 5 is referred to as an HS disk 5.

Figure 12:
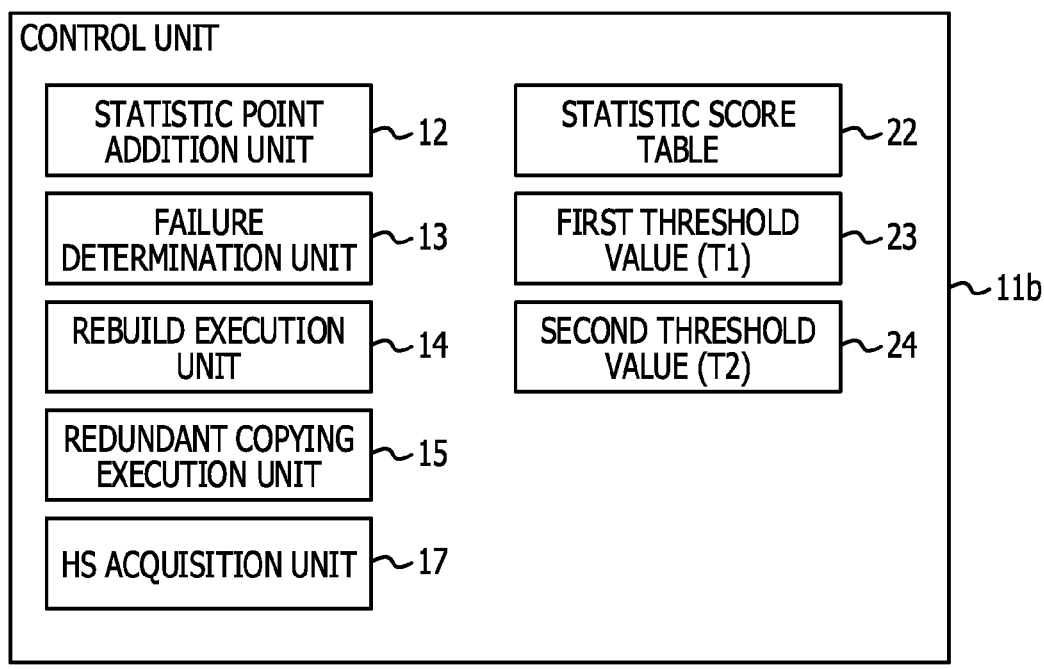
FIG. 12 is a diagram illustrating a functional configuration of a control unit of a disk array device according to a third embodiment.

FIG. 12 is a diagram illustrating a functional configuration of a control unit of the disk array device 2 according to the third embodiment. A control unit 11b includes the statistic point addition unit 12, the failure determination unit 13, the rebuild execution unit 14, the redundant copying execution unit 15, the statistic score table 22, the first threshold value (T1) 23, the second threshold value (T2) 24 and an HS acquisition unit (priority determination unit) 17.

The functions and configurations of the statistic point addition unit 12, the failure determination unit 13, the rebuild execution unit 14, the redundant copying execution unit 15, the statistic score table 22, the first threshold value 23, and the second threshold value 24 of the control unit 11b are the same as those of the respective functional units of the control unit 11 illustrated in FIG. 2 and thus, descriptions thereof will be omitted. When the number of HS disks 5 in the disk array device 2 is smaller than the number of required redundant copying, the HS acquisition unit 17 compares the priorities for recovery between the RAID groups and sequentially allocates the HS disks 5 to the RAID groups in a descending order of the degree of urgency.

Figure 13:
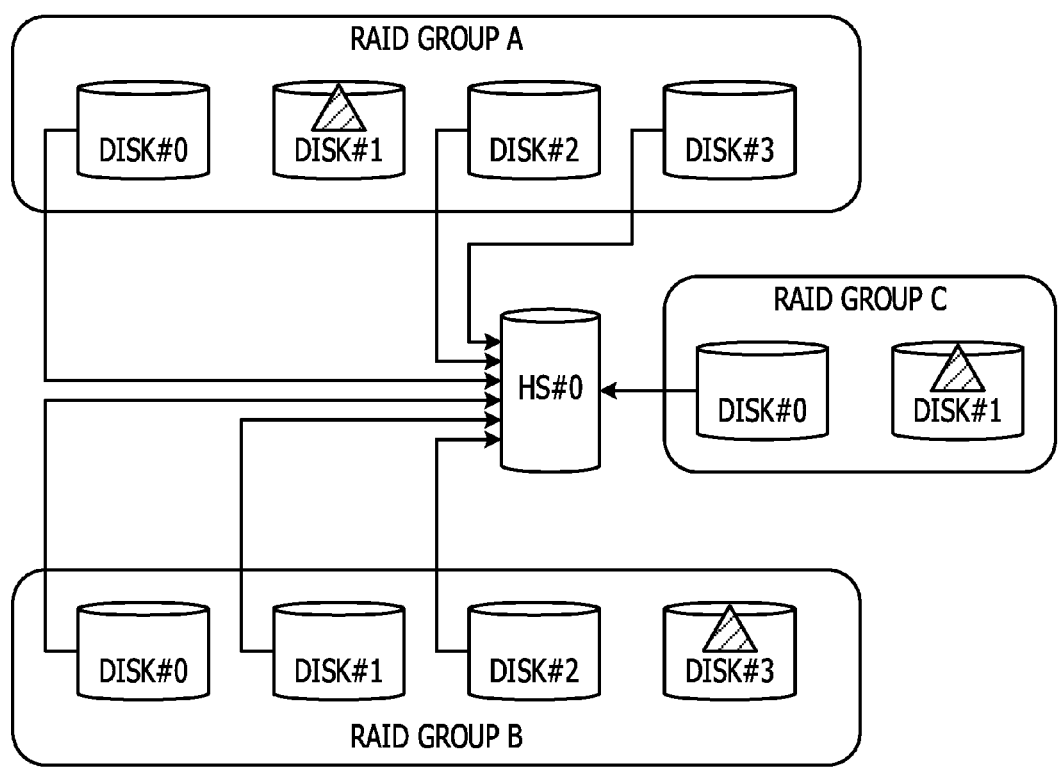
FIG. 13 is a diagram illustrating an HS acquisition operation of a disk array device according to a third embodiment.

FIG. 13 is a diagram illustrating an HS acquisition operation of the disk array device 2 according to the third embodiment. In the example of FIG. 13, three RAID groups of RAID group A, RAID group B and RAID group C exist. In this example, disk#1 of RAID group A becomes a SMART state and the redundant copying to HS#0 is being performed.

Thereafter, disk#3 of RAID group B along with disk#1 of RAID group C become the SMART state and thus, all the RAID groups need to be subjected to the redundant copying. However, since only a single HS#0 exists as the HS disk 5, the redundant copying for the RAID group B and RAID group C may not be performed.

Accordingly, the HS acquisition unit 17 compares the entire statistic scores for the respective RAID groups A, B and C with one another and tries to preferentially allocate the HS#0 to a RAID group having the largest entire statistic scores for a RAID group. For example, when a magnitude relationship between the entire statistic scores for the RAID groups is RAID group A<RAID group C<RAID group B, the HS acquisition unit 17 tries to preferentially allocate the HS#0 to the RAID group B.

However, when the redundant copying of another RAID group is being performed, the HS acquisition unit 17 stops the redundant copying depending on the extent of progress of the redundant copying which is being performed. For example, the HS acquisition unit 17 determines whether the extent of progress of the redundant copying, which is being performed, is 50% or less. When it is determined that the extent of progress of the redundant copying of the RAID group A is 50% or less, the HS acquisition unit 17 stops the redundant copying of RAID group A and allocates the HS#0 to RAID group B.

Here, a processing of preferentially allocating an HS disk 5 to a RAID group having a high priority is referred to as "HS takeover". The redundant copying of RAID group (RAID group A in the example of FIG. 13) from which the HS disk 5 is took over is started at the time when the start of the redundant copying becomes possible again in the disk array device 2.

When the extent of progress of the redundant copying of the RAID group A has exceeded 50%, the HS acquisition unit 17 does not perform the HS acquisition process. The redundant copying of RAID group B is started either when a maintenance disk is newly added or after the redundant copying of the RAID group that has already been performed is ended.

Figure 14:
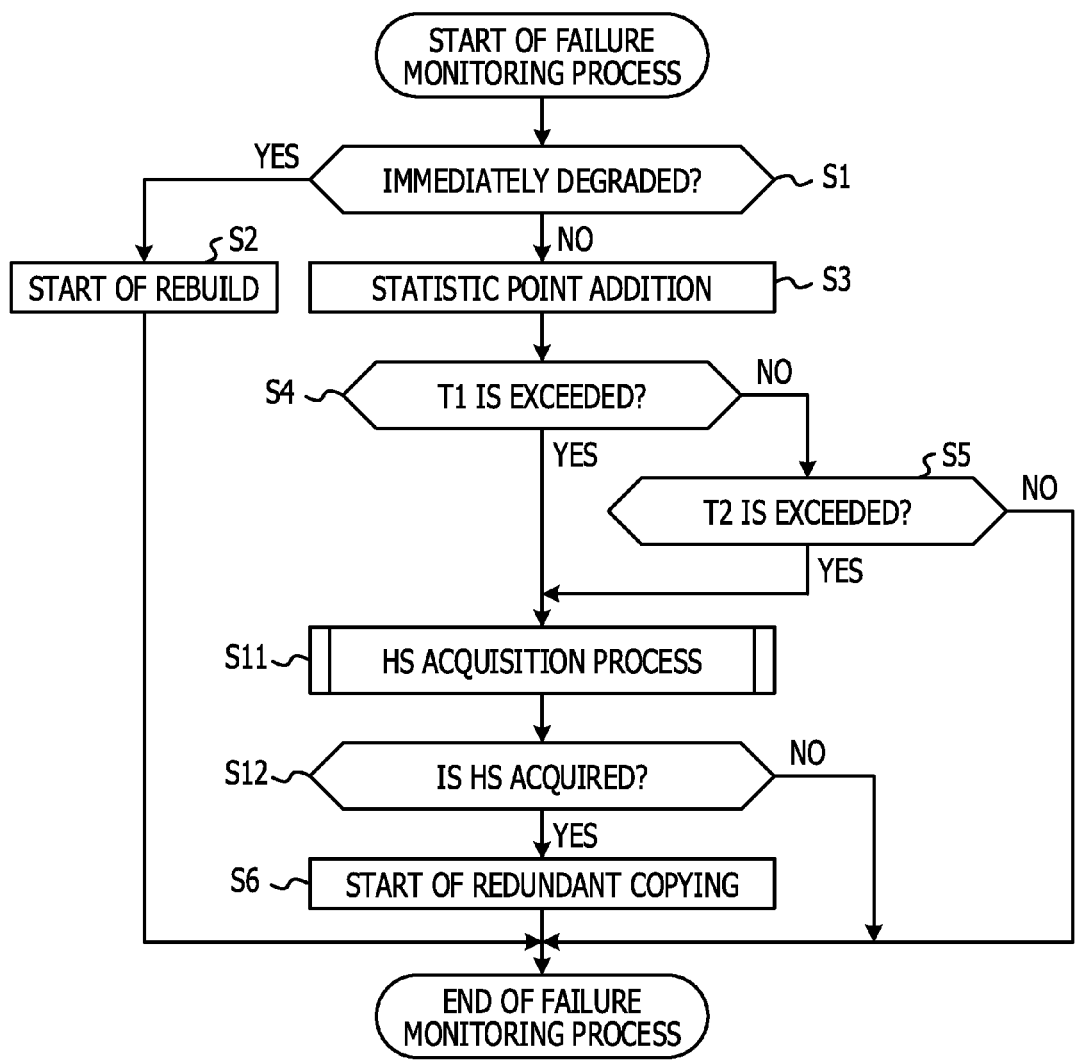
FIG. 14 is a flowchart illustrating operations of a control unit according to a third embodiment.

FIG. 14 is a flowchart illustrating a failure monitoring process (S1 to S6, S11 and S12) performed by the control unit 11b according to the third embodiment.

At S1, the statistic point addition unit 12 of the control unit 11b determines whether the event occurred in the disk 5 is an immediate degradation triggering event. When it is determined that the event occurred in the disk 5 is an immediate degradation triggering event ("YES" at S1), the rebuild execution unit 14 performs the rebuild processing of the disk 5 at S2 and ends the failure monitoring process.

When it is determined that the event occurred in the disk 5 is not an immediate degradation triggering event ("NO" at S1), the statistic point addition unit 12 performs the statistic point addition according to the event occurred in the disk 5 to update the statistic score table 22 at S3. At S4, the failure determination unit 13 determines whether the statistic score for the disk 5 in which the statistic point addition target event has occurred exceeds the first threshold value (T1) 23.

When it is determined that the statistic score for the disk 5 exceeds the first threshold value 23 ("YES" at S4), the process proceeds to S11 to be described below. When it is determined that the statistic score for the disk 5 does not exceed the first threshold value 23 ("NO" at S4), the failure determination unit 13 determines whether the statistic score for a redundant unit to which the disk 5 belongs exceeds the second threshold value (T2) 24 at S5.

When it is determined that the statistic score for the redundant unit does not exceed the second threshold value 24

("NO" at S5), the failure monitoring process is ended. When it is determined that the statistic score for the redundant unit exceeds the second threshold value 24 ("YES" at S5), the HS acquisition unit 17 performs the HS acquisition process at S11. The HS acquisition process will be described later with reference to FIG. 15.

Subsequently, at S12, the HS acquisition unit 17 determines whether an HS disk 5 is acquired by the HS acquisition process at S11. When it is determined that an HS disk 5 is not acquired by the HS acquisition process at S11 ("NO" at S12), the failure monitoring process is ended. When it is determined that an HS disk 5 is acquired by the HS acquisition process at S11 ("YES" at S12), the failure monitoring process proceeds to S6.

Figure 15:
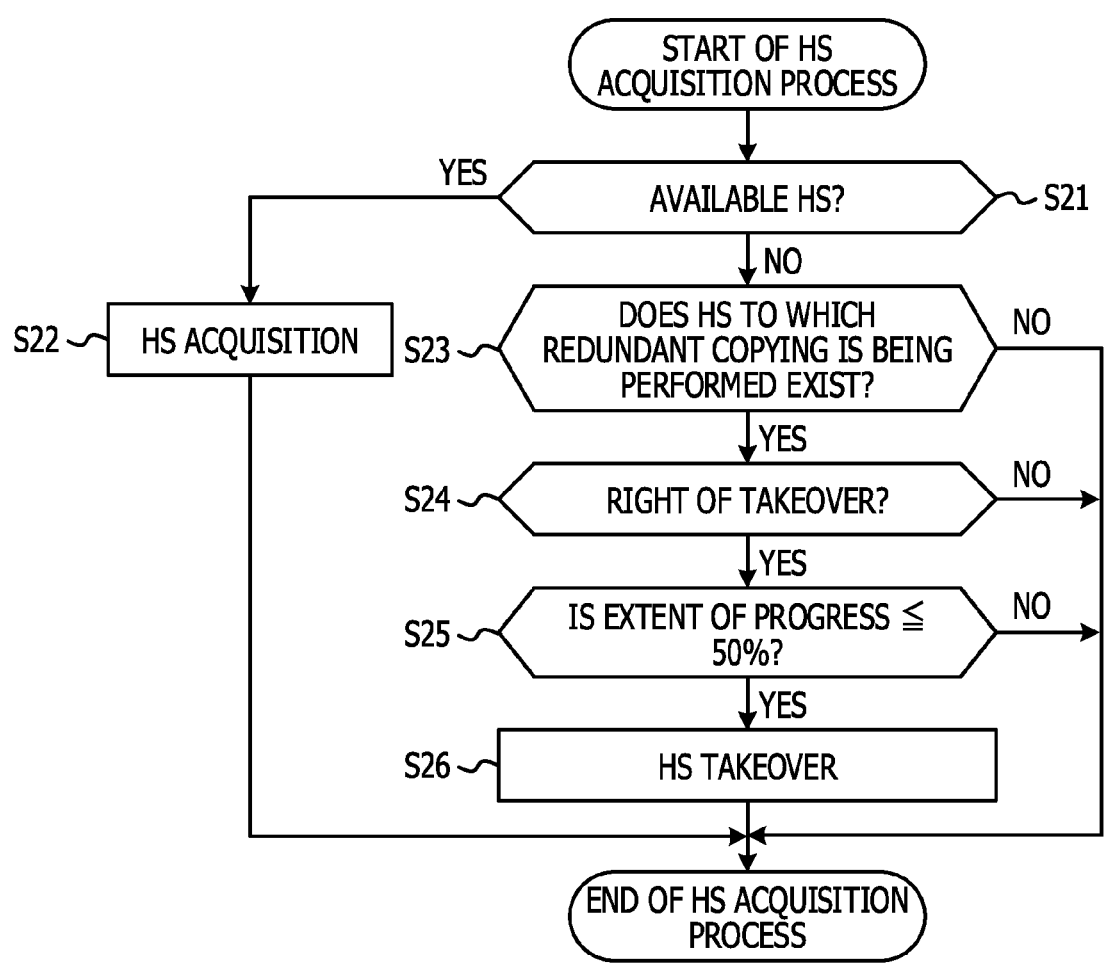
FIG. 15 is a flowchart illustrating an HS acquisition process performed by an HS acquisition unit according to a third embodiment.

At S6, the failure determination unit 13 causes the redundant copying execution unit 15 to perform the redundant copying of the disk 5, and the failure monitoring process is ended. FIG. 15 is a flowchart illustrating an HS acquisition process (S21 to S26) performed by the HS acquisition unit 17 according to the third embodiment. At S21, the HS acquisition unit 17 determines whether an available HS disk 5 exists in the disk array device 2.

When it is determined that an available HS disk 5 exists ("YES" at S21), the HS acquisition unit 17 acquires the available HS disk 5 at S22 and the HS acquisition process is ended. When it is determined that no available HS disk 5 exists ("NO" at S21), the HS acquisition unit 17 determines at S23 whether an HS disk 5 exists to which the redundant copying is being performed.

When it is determined that no HS disk 5 exists to which the redundant copying is being performed ("NO" at S23), the HS acquisition unit 17 ends the HS acquisition process. When it is determined that an HS disk 5 exists to which the redundant copying is being performed ("YES" at S23), the HS acquisition unit 17 determines at S24 whether the right of takeover exists. That is, the HS acquisition unit 17 determines whether a total of the statistic scores for a RAID group (referred to as its own RAID group) for which the redundant copying is required exceeds the statistic scores for the RAID group for which the redundant copying is being performed.

When it is determined that the total of the statistic scores for its own RAID group does not exceed the total of the statistic scores for the RAID group for which the redundant copying is being performed ("NO" at S24), the HS acquisition unit 17 ends the HS acquisition process. When it is determined that the total of the statistic scores for its own RAID group exceeds the total of the statistic scores for the RAID group for which the redundant copying is being performed ("YES" at S24), the HS acquisition unit 17 determines at S25 whether the extent of progress of the redundant copying that is being performed is 50% or less.

When it is determined that the extent of progress of the redundant copying that is being performed exceeds 50% ("NO" at S25), the HS acquisition unit 17 ends the HS acquisition process. When it is determined that the extent of progress of the redundant copying that is being performed is 50% or less ("YES" at S25), the HS acquisition unit 17 performs HS takeover at S26, that is, the HS acquisition unit 17 takes over the HS disk 5 used in the redundant copying that is being performed and ends the HS acquisition process.

As described above, when, for example, the number of the HS disks 5 is insufficient, the HS acquisition unit 17 of the control unit 11b according to the third embodiment adjusts the allocation of the HS disks 5 used in the redundant copying based on the statistic scores for the RAID groups. Therefore, the HS disks 5 are not allocated on a first-come and first-served basis for the redundant copying, but the HS disks 5 are preferentially allocated to the RAID groups having higher probability of the occurrence of a failure, such that the multiple failure of the disk array device 2 may be efficiently prevented to avoid a data loss.

The disk array device 2 according to the third embodiment may perform the redundant copying (recovery) process using a smaller number of HS disks 5 and thus, the cost of the disk array device 2 may be reduced.

Fourth Embodiment

Subsequently, the disk array device 2 according to a fourth embodiment will be described.

Figure 16:
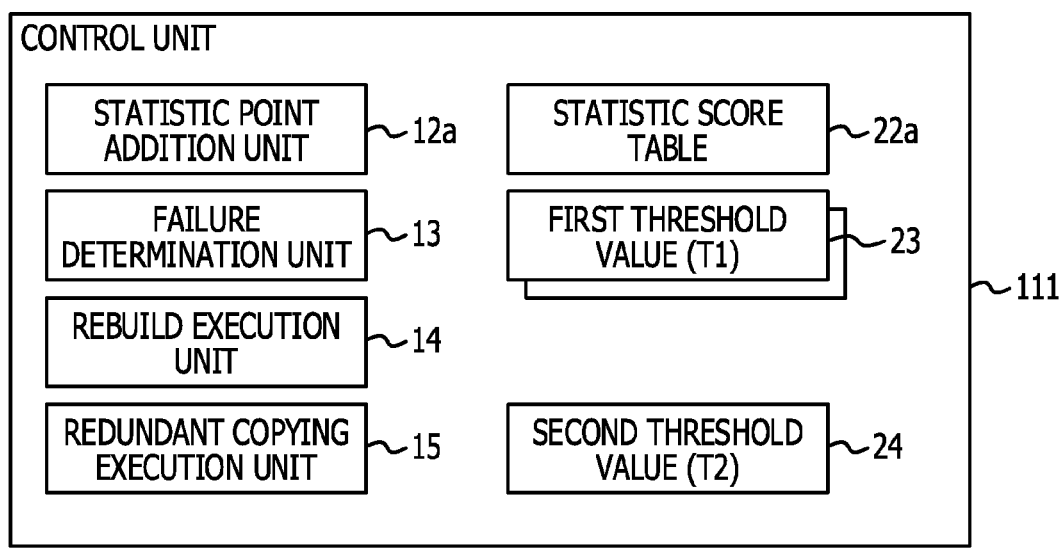
FIG. 16 is a diagram illustrating a functional configuration of a control unit of a disk array device according to a fourth embodiment.

FIG. 16 is a diagram illustrating a functional configuration of a control unit of the disk array device 2 according to the fourth embodiment. A control unit 111 includes a statistic point addition unit 12a, the failure determination unit 13, the rebuild execution unit 14, the redundant copying execution unit 15, a statistic score table 22a, a plurality of first threshold values (T1) 23, and the second threshold value (T2) 24.

The functions and configurations of the failure determination unit 13, the rebuild execution unit 14, the redundant copying execution unit 15, each of the plurality of first threshold values 23, and the second threshold value 24 of the control unit 111 are the same as those of the respective functional units of the control unit 11 illustrated in FIG. 2 and thus, descriptions thereof will be omitted. The statistic point addition unit 12a maintains a plurality of statistic scores in the statistic score table 22a.

Figure 17:
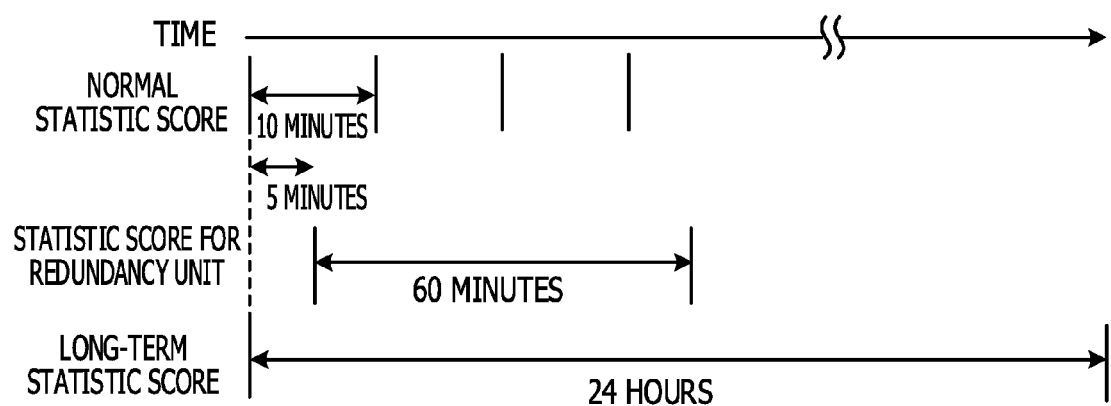
FIG. 17 is a timing chart illustrating a timing of clearing statistic scores by a statistic point addition unit according to a fourth embodiment.

FIG. 17 is a timing chart illustrating timings of clearing the statistic scores by the statistic point addition unit 12a according to the fourth embodiment. As illustrated in FIG. 17, the statistic point addition unit 12a according to the fourth embodiment maintains, in the statistic score table 22a, normal statistic scores that are cleared at a time interval of 10 minutes and long-term statistic scores that are cleared at a time interval of 24 hours, as the statistic scores for each disk 5.

In addition to the normal and long-term statistic scores, the statistic point addition unit 12a maintains the statistic score for a redundant unit in the statistic score table 22a. The statistic score for a redundant unit is cleared at a time interval of 60 minutes which is longer than the time interval of 10 minutes for the normal statistic score. As described above, the statistic point addition unit 12a according to the fourth embodiment maintains three types of statistic scores: a short-term statistic score for a disk 5, a middle-term statistic score for a redundant unit, and a long-term statistic score for a disk 5. Accordingly, the statistic point addition unit 12a enables the disk 5 to be subjected to the redundant copying (recovery) to avoid deterioration of the I/O performance of the disk 5 in a case where, for example, errors occur intermittently but the disk 5 is not degraded based on the normal statistic score.

The statistic point addition unit 12a starts monitoring of the statistic score for a disk 5 five minutes apart from a monitoring start timing of the statistic score for a redundant unit. When the statistic point addition for a disk 5 and the statistic point addition for a redundant unit are started at the same time, the monitoring start timing of the normal statistic score and that of the statistic score for a redundant unit overlap with each other once every 60 minutes. Therefore, the statistic point addition unit 12a starts the monitoring of the statistic score for a redundant unit about five minutes apart from the monitoring start timing of the normal statistic score to improve a monitoring accuracy.

As described above, the statistic point addition unit 12a according to the fourth embodiment maintains in the statistic score table 22a the short-term and long-term statistic scores for a disk 5 and at the same time, maintains the middle-term statistic score for a redundant unit. Therefore, the sign of the multiple failure of the disk 5 may be monitored timely. Further, the monitoring of the statistic score for a redundant unit is started about five minutes apart from the monitoring start timing of the normal statistic score to improve the monitoring accuracy.

Other Embodiments

Various modifications may be made without departing from the gist of the present embodiment irrespective of the embodiments describe above.

For example, in the first modified example of the first embodiment described above, the statistic score for a redundant unit is evaluated in an order of S51 and S52 in the flow of FIG. 4. However, the evaluation may be made at only one of S51 and S52. Further, the statistic score for a redundant unit is evaluated in an order of S51b, S52b and S53 in the flow of FIG. 8, but the evaluation may be made at only one of S51, S52, and S53, or at only any two of S51b, S52b, and S53.

A plurality of components of various modifications of the first embodiment described above and the second, third, and fourth embodiments may be properly combined. In examples of the first to fourth embodiments, the CPU 4 of the CM 3 is adapted to execute a storage control program so as to function as the control unit 11, 11a, 11b, or 111, the statistic point addition unit 12 or 12a, the failure determination unit 13, the rebuild execution unit 14, the redundant copying execution unit 15, the threshold value changing unit 16, and the HS acquisition unit 17.

The program for implementing the functions of the control unit 11, 11a, 11b, or 111, the statistic point addition unit 12 or 12a, the failure determination unit 13, the rebuild execution unit 14, the redundant copying execution unit 15, the threshold value changing unit 16 and the HS acquisition unit 17 may be provided to be recorded in a computer readable recording medium, such as for example, a flexible disk, a compact disc (CD) such as CD-ROM, CD-R and CD-RW, a digital versatile disc (DVD) such as DVD-ROM, DVD-RAM, DVD-R, DVD+R, DVD-RW, DVD+RW and HD-DVD, a blu-ray disk, a magnetic disk, an optical disk, a magneto-optical disk. The computer reads the program from the computer readable recording medium and uses the program by transmitting it to an internal storage device or an external storage device to be stored. The program may be recorded in the storage device (recording medium), such as a magnetic disk, an optical disk, a magneto-optical disk, to be provided to a computer via a communication path from the storage device, for example.

When implementing the functions as the control unit 11, 11a, 11b, or 111, the statistic point addition unit 12 or 12a, the failure determination unit 13, the rebuild execution unit 14, the redundant copying execution unit 15, the threshold value changing unit 16 and the HS acquisition unit 17, the program stored in the internal storage device (the memory 9 of the CM 3 or a ROM which is not illustrated) may be executed by a microprocessor (the CPU 4 of the CM 3) of the computer. The program recorded in the recording medium may be read and executed by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A storage control device, comprising:
    a storage unit configured to store therein a first score calculated for a first storage device; and
    a processor configured to
        add, upon detecting an event occurred in the first storage device, points corresponding to the event to the first score, and
        determine upon the addition, based on the first score and a second score, whether a sign of failure of the first storage device is detected, the second score being calculated for a first redundant unit of storage devices including the first storage device.
2. The storage control device according to claim 1, wherein the processor is configured to
    perform, upon determining that the sign is detected, duplication of the first storage device to one of spare storage devices.
3. The storage control device according to claim 2, wherein the processor is configured to
    preferentially perform the duplication of the first storage device over duplication of a second storage device when a first number of redundant units exceeds a second number of the spare storage devices, the redundant units each including a storage device to be duplicated, a priority of the first redundant unit being higher than a priority of a second redundant unit including the second storage device, the first redundant unit being one of the redundant units, the second redundant unit being another one of the redundant units.
4. The storage control device according to claim 3, wherein the processor is configured to
    stop the duplication of the second storage device in progress to start the duplication of the first storage device.
5. The storage control device according to claim 1, wherein the processor is configured to
    determine, upon determining that the first score exceeds a first threshold value or that the second score exceeds a second threshold value, that the sign is detected.
6. The storage control device according to claim 5, wherein the processor is configured to
    change the first threshold value when the second score exceeds the second threshold value.
7. A method for controlling storage devices, the method comprising:
    storing, by a computer, a first score calculated for a first storage device;
    adding, upon detecting an event occurred in the first storage device, points corresponding to the event to the first score; and
    determining upon the addition, based on the first score and a second score, whether a sign of failure of the first storage device is detected, the second score being calculated for a first redundant unit of storage devices including the first storage device.
8. The method according to claim 7, further comprising:
    performing, upon determining that the sign is detected, duplication of the first storage device to one of spare storage devices.

9. The method according to claim 8, further comprising:
preferentially performing the duplication of the first storage device over duplication of a second storage device when a first number of redundant units exceeds a second number of the spare storage devices, the redundant units each including a storage device to be duplicated, a priority of the first redundant unit being higher than a priority of a second redundant unit including the second storage device, the first redundant unit being one of the redundant units, the second redundant unit being another one of the redundant units.

10. The method according to claim 9, further comprising:
stopping the duplication of the second storage device in progress to start the duplication of the first storage device.

11. The method according to claim 7, further comprising:
determining, upon determining that the first score exceeds a first threshold value or that the second score exceeds a second threshold value, that the sign is detected.

12. The method according to claim 11, further comprising:
changing the first threshold value when the second score exceeds the second threshold value.

13. A non-transitory computer-readable recording medium having stored therein a program for causing a computer to execute a process, the process comprising:
storing a first score calculated for a first storage device;
adding, upon detecting an event occurred in the first storage device, points corresponding to the event to the first score; and
determining upon the addition, based on the first score and a second score, whether a sign of failure of the first storage device is detected, the second score being calculated for a first redundant unit of storage devices including the first storage device.

14. The non-transitory computer-readable recording medium according to claim 13, the process further comprising:
performing, upon determining that the sign is detected, duplication of the first storage device to one of spare storage devices.

15. The non-transitory computer-readable recording medium according to claim 14, the process further comprising:
preferentially performing the duplication of the first storage device over duplication of a second storage device when a first number of redundant units exceeds a second number of the spare storage devices, the redundant units each including a storage device to be duplicated, a priority of the first redundant unit being higher than a priority of a second redundant unit including the second storage device, the first redundant unit being one of the redundant units, the second redundant unit being another one of the redundant units.

16. The non-transitory computer-readable recording medium according to claim 15, the process further comprising:
stopping the duplication of the second storage device in progress to start the duplication of the first storage device.

17. The non-transitory computer-readable recording medium according to claim 13, the process further comprising:
determining, upon determining that the first score exceeds a first threshold value or that the second score exceeds a second threshold value, that the sign is detected.

18. The non-transitory computer-readable recording medium according to claim 17, the process further comprising:
changing the first threshold value when the second score exceeds the second threshold value.

* * * * *